United States Patent
Lee et al.

(10) Patent No.: US 10,810,435 B2
(45) Date of Patent: Oct. 20, 2020

(54) SEGMENTING OBJECTS IN VIDEO SEQUENCES

(71) Applicant: Adobe Inc., San Jose, CA (US)

(72) Inventors: Joon-Young Lee, Milpitas, CA (US); Seoungwug Oh, Seoul (KR); Ning Xu, Milpitas, CA (US)

(73) Assignee: Adobe Inc., San Jose, CA (US)

( * ) Notice: Subject to any disclaimer, the term of this patent is extended or adjusted under 35 U.S.C. 154(b) by 163 days.

(21) Appl. No.: 16/183,560

(22) Filed: Nov. 7, 2018

(65) Prior Publication Data
US 2020/0143171 A1 May 7, 2020

(51) Int. Cl.
G06K 9/00 (2006.01)
G06N 3/08 (2006.01)

(52) U.S. Cl.
CPC ..... *G06K 9/00765* (2013.01); *G06K 9/00671* (2013.01); *G06K 9/00744* (2013.01); *G06N 3/08* (2013.01)

(58) Field of Classification Search
None
See application file for complete search history.

(56) References Cited

U.S. PATENT DOCUMENTS

| | | | | |
|---|---|---|---|---|
| 8,358,691 B1 * | 1/2013 | Wang | ................. | G06T 7/20 375/240.02 |
| 10,671,855 B2 * | 6/2020 | Lee | ................. | G06T 9/002 |
| 2016/0037087 A1 * | 2/2016 | Price | ................. | H04N 5/272 348/586 |
| 2020/0034971 A1 * | 1/2020 | Xu | ................. | G06T 7/11 |

OTHER PUBLICATIONS

Agarwala,"Keyframe-Based Tracking for Rotoscoping and Animation", SIGGRAPH '04, 2004, 8 pages.
Bai,"Video SnapCut: Robust Video Object Cutout Using Localized Classifiers", ACM SIGGRAPH 2009 papers Article No. 70, Jul. 2009, 11 pages.
Barnes,"PatchMatch: A Randomized Correspondence Algorithm for Structural Image Editing", ACM SIGGRAPH 2009 Papers (New Orleans, Louisiana, Aug. 3-7, 2009), Aug. 3, 2009, 10 pages.
(Continued)

*Primary Examiner* — Soo Jin Park
(74) *Attorney, Agent, or Firm* — SBMC

(57) ABSTRACT

In implementations of segmenting objects in video sequences, user annotations designate an object in any image frame of a video sequence, without requiring user annotations for all image frames. An interaction network generates a mask for an object in an image frame annotated by a user, and is coupled both internally and externally to a propagation network that propagates the mask to other image frames of the video sequence. Feature maps are aggregated for each round of user annotations and couple the interaction network and the propagation network internally. The interaction network and the propagation network are trained jointly using synthetic annotations in a multi-round training scenario, in which weights of the interaction network and the propagation network are adjusted after multiple synthetic annotations are processed, resulting in a trained object segmentation system that can reliably generate realistic object masks.

20 Claims, 12 Drawing Sheets

(56) References Cited

OTHER PUBLICATIONS

Benard,"Interactive Video Object Segmentation in the Wild", Dec. 31, 2017, 7 pages.
Caelles,"One-Shot Video Object Segmentation", Apr. 13, 2017, 10 pages.
Caelles,"The 2018 DAVIS Challenge on Video Object Segmentation", Mar. 27, 2018, 4 pages.
Cheng,"Global Contrast based Salient Region Detection", IEEE Transactions on Pattern Analysis and Machine Intelligence, Mar. 2015, 14 pages.
Everingham,"The PASCAL Visual Object Classes (VOC) Challenge", International journal of computer vision, vol. 88, No. 2, Sep. 9, 2009, 34 pages.
Fan,"JumpCut: Non-Successive Mask Transfer and Interpolation for Video Cutout", Nov. 4, 2015, 10 pages.
Haralick,"Parallel Thinning with Two-Subiteration Algorithms", Mar. 1989, pp. 359-373.
Hariharan,"Semantic Contours from Inverse Detectors", In Proceedings of the IEEE International Conference on Computer Vision, Nov. 2011, 8 pages.
He,"Deep Residual Learning for Image Recognition", Proceedings of the IEEE conference on computer vision and pattern recognition, 2016., Dec. 10, 2015, 12 pages.
He,"Identity Mappings in Deep Residual Networks", In European Conference on Computer Vision. Springer, Jul. 25, 2016, 15 pages.
He,"Mask R-CNN", In Proceedings of the IEEE International Conference on Computer Vision, Jan. 24, 2018, 12 pages.
Hu,"Squeeze-and-Excitation Networks", Apr. 5, 2018, 11 pages.
Isola,"Image-to-Image Translation with Conditional Adversarial Networks", 2017 IEEE Conference on Computer Vision and Pattern Recognition (CVPR), Nov. 22, 2017, 17 pages.
Jaderberg,"Spatial Transformer Networks", In Advances in neural information processing systems, Feb. 4, 2016, 14 pages.
Jain,"FusionSeg: Learning to combine motion and appearance for fully automatic segmentation of generic objects in videos", In Proceedings of the IEEE Conference on Computer Vision and Pattern Recognition, Aug. 18, 2017, 10 pages.
Jampani,"Video Propagation Networks", Proceedings of the IEEE Conference on Computer Vision and Pattern Recognition, Apr. 11, 2017, 16 pages.
Khoreva,"Learning Video Object Segmentation from Static Images", In Proceedings of the IEEE Conference on Computer Vision and Pattern Recognition, Dec. 8, 2016, 16 pages.
Li,"Roto++: Accelerating Professional Rotoscoping using Shape Manifolds", ACM Transactions on Graphics (TOG), Jul. 11, 2016, 15 pages.
Lin,"Feature Pyramid Networks for Object Detection", In the IEEE Conference on Computer Vision and Pattern Recognition (CVPR), Apr. 19, 2017, 10 pages.
Lin,"Microsoft COCO: Common Objects in Context", Computer Vision and Pattern Recognition, May 1, 2014, 16 pages.
Long,"Fully Convolutional Networks for Semantic Segmentation", IEEE Conference on Computer Vision and Pattern Recognition (CVPR), Nov. 14, 2014, 10 pages.
Maninis,"Video Object Segmentation Without Temporal Information", May 16, 2018, 15 pages.
Nagaraja,"Video Segmentation with Just a Few Strokes", In Proceedings of the IEEE International Conference on Computer Vision, Dec. 2015, 9 pages.
Oh,"Fast Video Object Segmentation by Reference-Guided Mask Propagation", In the IEEE Conference on Computer Vision and Pattern Recognition (CVPR), Jun. 18, 2018, pp. 7376-7385.
Pinheiro,"Learning to Refine Object Segments", In European Conference on Computer Vision. Springer, Jul. 26, 2016, 18 pages.
Pont-Tuset,"The 2017 DAVIS Challenge on Video Object Segmentation", Mar. 1, 2018, 6 pages.
Price,"LIVEcut: Learning-based Interactive Video Segmentation by Evaluation of Multiple Propagated Cues", 2009 IEEE 12th International Conference on Computer Vision, Sep. 2009, pp. 779-786.
Sangkloy,"Scribbler: Controlling Deep Image Synthesis with Sketch and Color", Computer Vision and Pattern Recognition, CVPR, 2017., Dec. 5, 2016, 13 pages.
Shi,"Hierarchical Image Saliency Detection on Extended CSSD", IEEE Transactions on Pattern Analysis and Machine Intelligence 38, 4 (2016), Apr. 2016, pp. 717-729.
Tokmakov,"Learning Video Object Segmentation with Visual Memory", In Proceedings of the IEEE International Conference on Computer Vision, Aug. 10, 2017, 11 pages.
Tsai,"Video Segmentation via Object Flow", In Proceedings of the IEEE Conference on Computer Vision and Pattern Recognition, Aug. 1, 2018, 11 pages.
Voigtlaender,"Online Adaptation of Convolutional Neural Networks for Video Object Segmentation", In British Machine Vision Conference., Aug. 1, 2017, 16 pages.
Wang,"Interactive Video Cutout", Proceedings of ACM SIGGRAPH, Jul. 31, 2005, 10 pages.
Xu,"Deep GrabCut for Object Selection", Jul. 14, 2017, 12 pages.
Xu,"Deep Interactive Object Selection", Mar. 13, 2016, 9 pages.
Zhang,"Real-Time User-Guided Image Colorization with Learned Deep Priors", May 8, 2017, 11 pages.
Zhong,"Discontinuity-Aware Video Object Cutout", ACM Transactions on Graphics (TOG) 31, 6, Nov. 1, 2012, 10 pages.

\* cited by examiner

SEGMENTING OBJECTS IN VIDEO SEQUENCES

BACKGROUND

Segmenting objects in video sequences includes identifying an object (e.g., an object in a foreground of a scene) and separating the object from the scene in a plurality of image frames making up a video sequence. Usually, objects in video sequences are segmented on a frame-by-frame basis, and a mask for an object is created for each image frame based on user inputs at each image frame. For instance, a user, such as a trained designer, provides input for each image frame of a video sequence to segment an object in the video sequence and generate an object mask. The designer provides multiple inputs for each image frame, such as inputs to identify boundaries of an object, and inputs to confirm user selections. Since a video sequence of only a few seconds can include hundreds of image frames, segmenting objects in video sequences requires significant time and user interactions, costing money for professional designers and often prohibiting consumers from engaging in video editing that segments objects.

For users (e.g., consumers) that do perform video editing that includes segmenting objects, because of the proliferation of mobile devices (e.g., smart phones) including video capture devices, the users often perform object segmentation on a mobile device. However, due to the small screen size of many mobile devices, user interactions may be difficult to provide that accurately segment objects in video sequences. For instance, users may not be able to identify fine details with a touch gesture on a small touchscreen of a mobile device. Moreover, because of the large number of image frames that require user interactions, most mobile-device users grow tired of providing input for all image frames of a video sequence. Accordingly, object segmentation performed on a mobile device usually results in poor-quality masks that are generated to represent target objects in a video sequence.

Furthermore, object segmentation systems, such as included in a video editing application running on a mobile device, often include an adaptive model (e.g., a neural network, machine learning model, and the like) that has been trained using training datasets of image frames in video sequences. Training an object segmentation system often requires fully-annotated object masks for at least some of the image frames of a video sequence. Since training an object segmentation system generally requires large numbers of images, obtaining a suitable training dataset of image frames with fully-annotated object masks can be cost prohibitive.

Moreover, most object segmentation systems are trained for each input-output pair generated. For instance, for each image frame provided to the object segmentation system, an object mask is generated, and weights of the object segmentation system are adjusted. However, because the quality of the object mask generated can be poor or unreliable, training the object segmentation system may require significant numbers of training images to arrive at a suitable setting of the weights of the object segmentation system, or worse, a suitable setting of weights may not be learned for the object segmentation system.

Consequently, performance of object segmentation systems remains limited by the user interactions required for each image frame, and the setting of the object segmentation system learned when the object segmentation system is trained.

SUMMARY

Techniques, systems, and devices are described to segment objects in video sequences. A user can provide annotations, such as scribbles, to designate an object in any image frame of a video sequence, and need not provide user annotations for all image frames of the video sequence. An interaction network (e.g., an encoder-decoder structure) receives a user annotation for an image frame, and generates a mask estimation for the object in the image frame. The interaction network is coupled both internally and externally to a propagation network (e.g., another encoder-decoder structure) that propagates the mask estimation for the image frame to other image frames of the video sequence, so that an object mask is generated for each image frame of the video sequence for each user annotation received. A user can provide an annotation to any suitable image frame of the video sequence, and a feature aggregation module accumulates feature maps generated by the interaction network for each user annotation and provides an aggregated feature map to the propagation network. The interaction network and the propagation network are trained jointly using synthetic annotations in a multi-round training scenario, in which multiple synthetic annotations are received, and for each synthetic annotation received, the interaction network generates a mask estimation and the propagation network propagates the mask estimation to image frames of the video sequence. Weights of the interaction network and the propagation network are adjusted after the multiple synthetic annotations are received and respective masks generated, rather than for each synthetic annotation received. Hence, training updates are based on higher-quality masks, resulting in a trained object segmentation system that can reliably generate realistic object masks.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
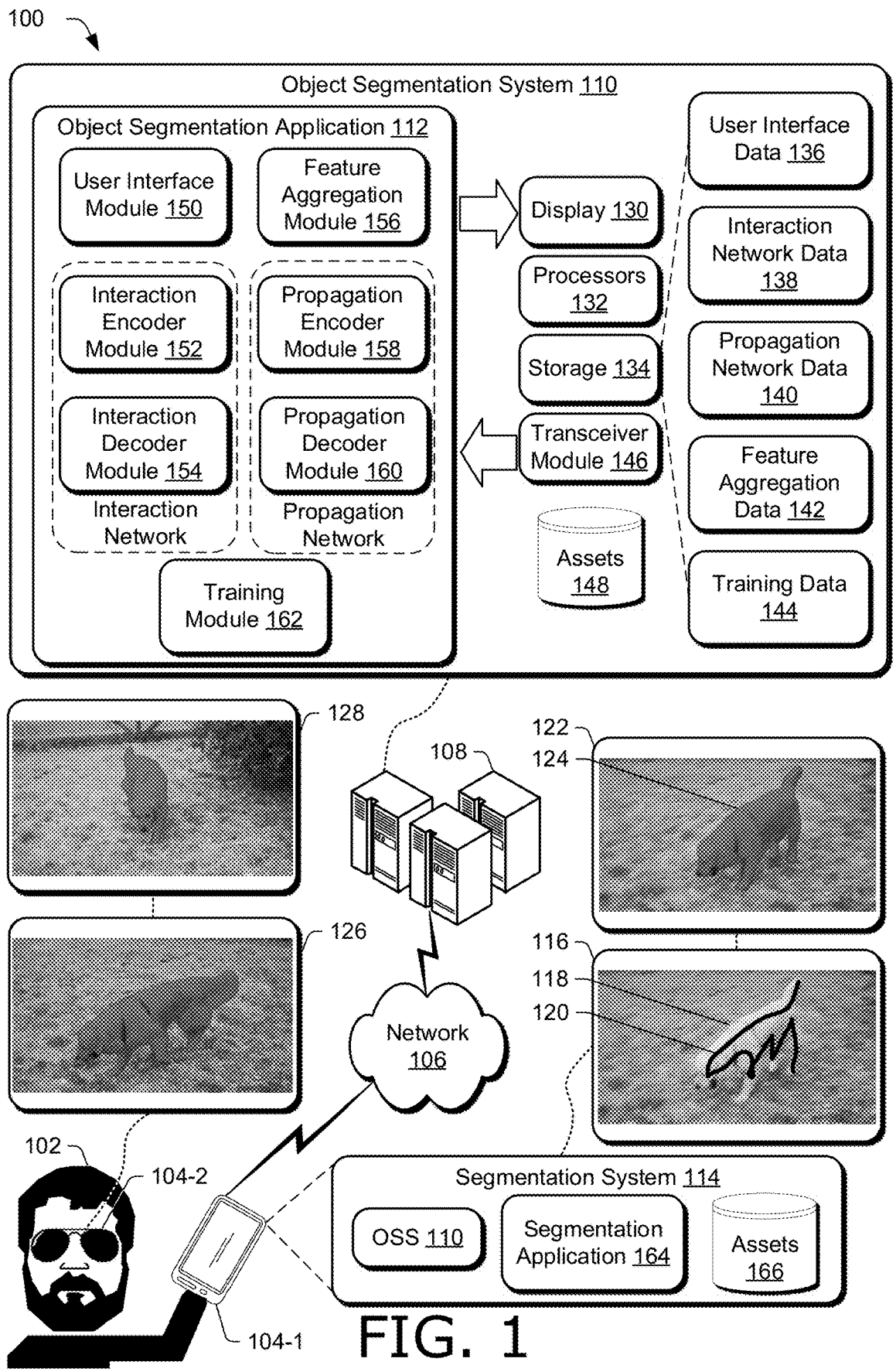
FIG. 1 illustrates a digital medium environment in an example implementation that is operable to employ techniques described herein.

Because most object segmentation systems require user input for each image frame of a video sequence, and most video sequences include large numbers of image frames, segmenting objects in video sequences with most object segmentation systems requires significant time and effort. When an object segmentation system is implemented on a mobile device, such as within a video editing application on the mobile device, the small screen of the mobile device makes it difficult for the user to provide input for each image frame of the video sequence, so that the object segmentation system usually generates object masks that do not accurately represent the object. Moreover, object segmentation systems implemented on mobile devices are usually trained with weights adjusted for each input-output training pair of the object segmentation system, so that the weights learned during training may not result in reliable and accurate object masks when deployed on the mobile device.

Accordingly, this disclosure describes systems, techniques, and devices for segmenting objects in video sequences based on user annotations applied to one or more image frames of a video sequence of a user's choice. A user interface is generated and exposed in which a user can provide simple user annotations, such as scribbles, to any image frame of a video sequence, in any order. An object segmentation system is trained in a multi-round training scenario, so that reliable mask estimations are generated and used to adjust weights of the object segmentation system, resulting in a trained object segmentation system that reliably generates accurate object masks without requiring burdensome amounts of user input.

An object segmentation system includes an interaction network and a propagation network that are coupled together with a feature aggregation module. A user interface module receives a user annotation to designate an object, such as a scribble made with a touch gesture on a touchscreen of a computing device or a cursor controlled by a mouse. A user annotation may include multiple scribbles, including positive scribbles to indicate the object in an image frame and negative scribbles to indicate regions of the image frame that do not correspond to the object. Hence, the user annotation (e.g., scribble) may be a simple, partial annotation that does not completely designate the object in an image frame. The user interface module provides positive and negative images for the user annotation to an interaction network.

The interaction network also receives a mask for the object in the image frame if a mask is available, such as a mask generated from a previous user annotation. The image frame, positive and negative images for the user annotation, and previously-computed mask are concatenated and provided as input to an interaction encoder module of the interaction network. The interaction encoder module generates feature maps based on the input it receives, and provides a current feature map to a feature aggregation module and an interaction decoder module of the interaction network. In one example, the interaction encoder module also provides intermediate feature maps (e.g., corresponding to different scales) to the interaction decoder module via skip connections. The interaction decoder module generates a mask estimation for the object in the image frame provided to the interaction network (e.g., an object mask).

The interaction network is coupled internally to a propagation network via a feature aggregation module. The feature aggregation module accumulates features generated for each round of user annotations (e.g., for each set of user annotations applied to an image frame), and updates an aggregated feature map by combining a previously-generated aggregated feature map with a current feature map provided by the interaction network. In one example, combining weights are based on two weight vectors whose sum is unity that are determined from respective feature vectors determined from a previously-generated aggregated feature map and a current feature map. The propagation network includes a propagation encoder module and a propagation decoder module, and the feature aggregation module couples the interaction network internally to the propagation network by providing an aggregated feature map to the propagation decoder module.

The interaction network and the propagation network are also coupled externally. For instance, a mask estimation for an image frame generated by the interaction network is provided as an input to the propagation network, which propagates the mask to other image frames of the video sequence. Moreover, a mask generated by the propagation network for a certain image frame (e.g., by propagating a mask provided by the interaction network) can be provided as an input to the interaction network when a user provides a subsequent annotation to the certain image frame.

The propagation network receives a mask estimation generated for an image frame by the interaction network, and propagates the mask estimation to other image frames of the video sequence. The propagation network propagates the mask estimation by concatenating an additional image frame of the video sequence, a previously-generated mask for the additional image frame (if available), and a mask of a different image frame than the additional image frame (e.g., a neighboring image frame to the image frame). In one example, the mask of the different image frame is a mask estimation generated by the interaction network. The concatenated inputs are provided to the propagation encoder module of the propagation network, which generates a propagation feature map. The propagation feature map generated by the propagation encoder module is concatenated with an aggregated feature map provided by the feature aggregation module, and provided to the propagation decoder module of the propagation network. The propagation decoder module generates an additional mask estimation corresponding to the additional image frame provided to the propagation network.

Hence, based on the mask estimation generated for one image frame by the interaction network, the propagation network generates a respective mask estimation for other image frames of the video sequence, thereby propagating the mask generated by the interaction network. A user may provide a user annotation to any image frame or existing mask of an image frame, which triggers the interaction network, feature aggregation module, and propagation network, so that an updated mask is generated for each image frame of a video sequence based on a user annotation to one image frame of the video sequence, significantly reducing the effort needed to segment objects in video sequences compared to systems that require user inputs for each image frame of the video sequence.

To train an object segmentation system with a limited number of training inputs and so that the object segmentation system learns weights that reliably result in accurate object masks, the interaction network and propagation network are trained jointly in a multi-round training scenario. Training images are obtained and synthetic annotations are generated. In one example, a synthetically-generated annotation is generated by selecting a seed pixel within an area in an image frame that includes an object, and a random walk is determined from the seed pixel. The angle of the random walk may be randomly initialized with any direction, and steered within a narrower angle that is randomly selected at each step. The step size can be determined based on the size of the area, so that the synthetically-generated annotation stays within the area. Additionally or alternatively, a synthetically-generated annotation can be generated with a skeletization algorithm. For instance, an area in an image frame that includes an object may be determined, and a skeleton generated for the area by successively thinning pixels of the area until a skeleton remains.

The interaction network and the propagation network are trained jointly using the synthetically-generated annotations in a multi-round training scenario, in which multiple synthetic annotations are received. For each synthetically-generated annotation received, the interaction network generates a mask estimation and the propagation network propagates the mask estimation to image frames of the video sequence. Weights of the interaction network and the propagation network are adjusted after the multiple synthetically-generated annotations are received and respective masks generated, rather than for each synthetically-generated annotation received, so that training updates are based on higher-quality mask estimations. Hence, an object segmentation system trained with a multi-round training scenario can generate more realistic object masks and is more reliable than object segmentation system trained by adjusting weights based on each input-output pair.

In the following discussion an example digital medium environment is described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes a user 102 having at least one computing device. In the example in FIG. 1, user 102 is illustrated as having two computing devices, computing device 104-1 and computing device 104-2 (collectively computing devices 104). For instance, computing device 104-1 depicts a smart phone, and computing device 104-2 depicts a pair of eye glasses, such as smart goggles. Computing devices 104 are example computing devices, and any suitable computing device is contemplated, such as a mobile phone, tablet, laptop computer, desktop computer, gaming device, goggles, glasses, camera, digital assistant, wearable device (e.g., watch, arm-band, adhesive patch, etc.), echo device, image editor, non-linear editor, digital audio workstation, copier, scanner, and the like that may include an application to segment objects in video sequences. Furthermore, discussion of one of computing devices 104 is not limited to that computing device, but generally applies to each of the computing devices 104. Moreover, computing devices 104 may range from full resource devices with substantial memory and processor resources (e.g., personal computers, game consoles) to a low-resource device with limited memory or processing resources (e.g., mobile devices).

Various types of input devices and input instrumentalities can be used to provide input to computing devices 104. For example, computing devices 104 can recognize input as being a mouse input, stylus input, touch input, input provided through a natural user interface, user gestures on a touchscreen, combinations thereof, and the like. Thus, computing devices 104 can recognize multiple types of gestures including touch gestures and gestures provided through a natural user interface. In one example, computing devices 104 include speech recognition, identification, and synthesis functionalities, microphones, and speakers that allow computing devices 104 to communicate with user 102 in a conversation. Moreover, computing devices 104 can include a video capture device (e.g., a camera) configured to capture image frames and video sequences made up of image frames.

Figure 11:
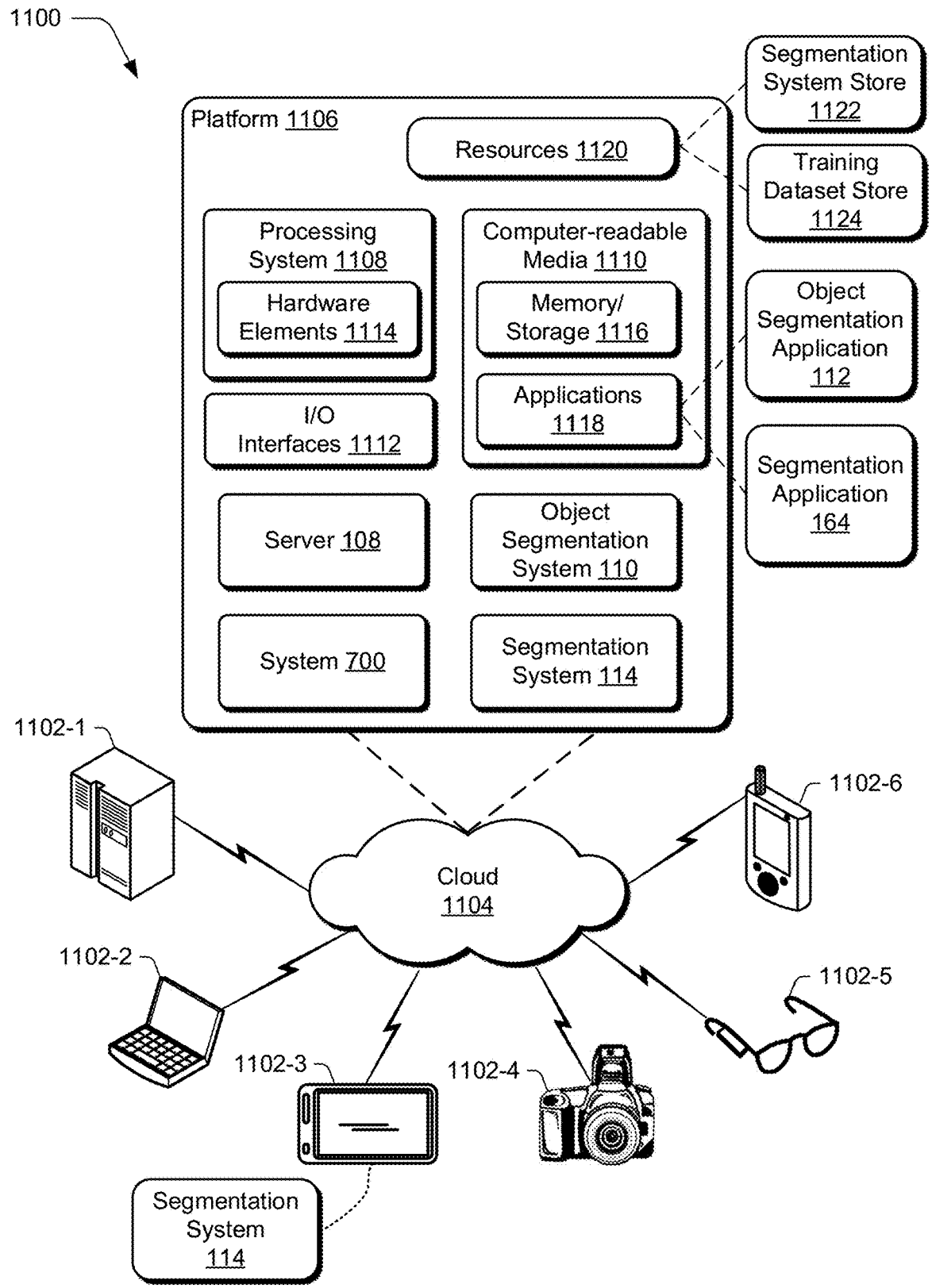
FIG. 11 illustrates an example system including various components of an example device that can be implemented as any type of computing device as described and/or utilized with reference to FIGS. 1-10 to implement aspects of the techniques described herein.

Furthermore, computing devices 104 may be representative of one or a plurality of different devices, such as one or more devices connected to a network that perform operations "over the cloud" as further described in relation to FIG. 11. In one example, computing devices 104 are communicatively coupled to each other, such as with a low power wireless communication standard (e.g., a Bluetooth® protocol). For instance, computing device 104-1 can communicate wirelessly with computing device 104-2. Hence, an image or video sequence processed on one device (e.g., computing device 104-1) can be communicated to, and displayed on another device (e.g., computing device 104-2).

Computing devices 104 are also coupled to network 106. Network 106 communicatively couples computing devices 104 with server 108. For clarity, only computing device 104-1 is illustrated in FIG. 1 as coupled to network 106, though computing device 104-2 can also be coupled to server 108 via network 106. Network 106 may include a variety of networks, such as the Internet, an intranet, local area network (LAN), wide area network (WAN), personal area network (PAN), cellular networks, terrestrial networks, satellite networks, combinations of networks, and the like, and as such may be wired, wireless, or a combination thereof.

Server 108 may include one or more servers or service providers that provide services, resources, or combinations thereof to computing devices 104. In one example, resources provided by server 108 may be licensed, purchased, or may be made freely available, (e.g., without authentication, license, or account-based access). The resources can include any suitable combination of services and content, such as made available over network 106 by one or more providers. Some examples of services include, but are not limited to, an on-line shopping service, a photo editing service, an image database service (e.g., a service providing training images from a database), an object segmentation service (e.g., a service providing pre-trained object segmentation systems), a web development and management service, a collaboration service, a social networking service, a messaging service, an advertisement service, a graphics design service, an image storage service (including storage and access of photos, documents, records, files, video sequences, and the like), and so forth. Content may include various combinations of assets, including videos, ads, audio, multi-media streams, animations, images, reference images, training data, web documents, web pages, applications, device applications, text documents, drawings, presentations, stock photographs, user profiles, user preferences, user data (e.g., images stored in an image gallery), and the like.

In the example in FIG. 1, server 108 includes object segmentation system 110, which includes object segmentation application 112 (discussed below in more detail), and computing devices 104 include segmentation system 114. Object segmentation system 110 and segmentation system 114 may work together to segment objects in video sequences. For instance, object segmentation system 110 may train an object segmentation system (e.g., an adaptive model, such as one or more neural networks, encoder-decoder structures, and the like), to segment objects in video sequences, and provide the trained object segmentation system via network 106 to segmentation system 114 of computing devices 104. One or more of computing devices 104 may use a pre-trained object segmentation system provided by object segmentation system 110 with segmentation system 114 to segment objects in video sequences.

For instance, in the example in FIG. 1, user 102 obtains an image frame 116 via computing device 104-1. Image frame 116 can be any suitable image frame of any suitable video sequence. Image frame 116 illustrates an object 118, e.g., a dog, against a background. User 102 provides user annotation 120 for image frame 116 to indicate object 118. User annotation 120 can be any suitable annotation, such as a bounding box, a click, a brush stroke, a line, a curve, an unconstrained trace, combinations thereof, and the like. In the example in FIG. 1, user annotation 120 denotes a scribble, such as a scribble made with a touch gesture on a touchscreen of computing device 104-1 or a cursor controlled by a mouse.

Based on user annotation 120 indicating object 118 in image frame 116, segmentation system 114 generates mask image 122. A mask image can include values in a range (e.g., with the range [0, 1]) and represent a probability of each pixel belonging to a target object. Mask image 122 corresponds to image frame 116, and includes mask 124. Mask 124 is an example of a mask estimation corresponding to object 118 (e.g., an object mask) that is generated by segmentation system 114 based on user annotation 120. Mask 124 is illustrated as dark pixels representing object 118 that have been segmented in mask image 122, and separated from the background of mask image 122. Based on mask image 122, mask 124 is propagated to other image frames than image frame 116 of the video sequence. For instance, mask image 126 and mask image 128 correspond to respective image frames of the video sequence that are different image frames than image frame 116, and include masks of object 118 that have been generated by propagating mask 124 to the other image frames. Image frame 116 can be any suitable image frame in the video sequence. Image frame 116 need not be a first or last image frame in the video sequence, but rather can be user-selected, and a mask generated for an object in image frame 116 can be propagated to all other image frames in the video sequence, e.g., backwards and forwards in time within the video sequence. Hence, user annotation 120 on one image frame to designate an object is used to generate masks for the object in other image frames of the video sequence.

Object segmentation system 110 includes display 130. Display 130 can be any suitable type of display, such as a liquid crystal display, plasma display, head-mounted display, projector and screen, a touchscreen that recognizes user gestures (e.g., touch gestures), and the like. A touchscreen of display 130 can include any suitable type of touchscreen, such as a capacitive touchscreen, a resistive touchscreen, a surface acoustic wave touchscreen, an infrared touchscreen, an optical imaging touchscreen, an acoustic pulse recognition touchscreen, combinations thereof, and the like. Moreover, display 130 can display any suitable interface.

Object segmentation system 110 also includes processors 132. Processors 132 can include any suitable type and number of processors. Hence, object segmentation system 110 may be implemented at least partially by executing instructions stored on storage 134 on processors 132. For instance, processors 132 may execute portions of object segmentation application 112.

Storage 134 can be any suitable type of storage accessible by or contained in object segmentation system 110. Storage 134 stores and provides access to and from memory included in storage 134 for any suitable type of data. For instance, storage 134 includes user interface data 136, such as image frames, synthetically-generated annotations, user annotations, positive and negative images (e.g., images with user annotations that indicate an object in an image frame and images with user annotations that indicate an area of an image frame that does not include an object, respectively), training images, images of training databases, regions-of-interests of image frames corresponding to objects, annotations of image frames, sources of image frames (e.g., an indicator of a database or video gallery from which an image frame was obtained), metadata of image frames, a format of an image frame (e.g., a file format), an image frame identifier in a sequence of images, such as a video sequence, thumbnail images, combinations thereof, and the like.

Storage 134 also includes interaction network data 138, including data regarding an interaction network of object segmentation system 110, such as feature maps (e.g., intermediate feature maps of skip connections, a current feature map of a feature encoder, etc.), mask images (e.g., images with masks of image frames determined from a previous user annotation), mask estimations of image frames generated by an interaction network, weights of an interaction network, image frame indicators, an indicator of a number of user annotations for an image frame, positive and negative images, combinations thereof, and the like.

Storage 134 also includes propagation network data 140, including data regarding a propagation network of object segmentation system 110, such as feature maps (e.g., intermediate feature maps of skip connections, a current feature map of a feature encoder, etc.), mask images (e.g., images with masks of image frames determined from a previous user annotation or a current user annotation), combining weights of mask estimations (e.g., combining weights based on frame numbers indicating a distance between image frames) mask estimations of image frames generated by an interaction network, masks of image frames generated by a propagation network based on previous user annotations, weights of a propagation network, image frame indicators, combinations thereof, and the like.

Storage 134 also includes feature aggregation data 142, including data regarding accumulation of feature maps of object segmentation system 110, such as feature maps (e.g., a current feature map of a feature encoder, a previously-generated aggregated feature map, a currently-generated aggregated feature map, etc.), feature vectors, weight vectors, combining weights, weights of a fully-connected network used to generate an aggregated feature map, a number of feature maps that have been accumulated to form an aggregated feature map, combinations thereof, and the like.

Storage 134 also includes training data 144, including data regarding training object segmentation system 110, such as a training database used to train object segmentation systems, training losses computed while training an object segmentation system, synthetically-generated annotations, indicators of image frames of a training dataset used to train an object segmentation system, indicators of image frames of a training dataset skipped when training an object segmentation system, a number of rounds of user annotations in a multi-round training scenario used to update weights of an object segmentation system, combinations thereof, and the like.

Furthermore, object segmentation system 110 includes transceiver module 146. Transceiver module 146 is representative of functionality configured to transmit and receive data using any suitable type and number of communication protocols. For instance, data within object segmentation system 110 may be transmitted to server 108 with transceiver module 146. Furthermore, data can be sent from server 108 with transceiver module 146. For instance, transceiver module 146 can transmit and receive data to and from computing devices 104. In one example, transceiver module 146 includes a low power wireless communication standard (e.g., a Bluetooth® protocol) for communicating data between computing devices, such as between computing device 104-1 and computing device 104-2.

Object segmentation system 110 also includes assets 148. In one example, assets 148 are stored in storage 134. Assets 148 can include any suitable asset used or generated by object segmentation system 110. In one example, assets 148 include adaptive models, such as neural networks, machine learning models, encoder-decoder structures, object segmentation systems (e.g., interaction networks, propagation networks, and feature aggregation modules), and the like, that have been trained by object segmentation system 110. Hence, pre-trained models of assets 148 can be provided from server 108 to computing devices 104 via network 106 and used in any suitable application to segment objects in video sequences.

Object segmentation system 110 also includes object segmentation application 112. Object segmentation application 112 includes user interface module 150, interaction encoder module 152, interaction decoder module 154, feature aggregation module 156, propagation encoder module 158, propagation decoder module 160, and training module 162. These modules work in conjunction with each other to segment objects in video sequences.

Interaction encoder module 152 and interaction decoder module 154 are included in an interaction network of object segmentation system 110. Propagation encoder module 158 and propagation decoder module 160 are included in a propagation network of object segmentation system 110. The interaction network and the propagation network can be coupled internally by feature aggregation module 156 (discussed below in more detail) to implement an object detection system to segment objects in images. For instance, based on a user annotation to indicate an object in one image frame in a video sequence, a mask estimation for the object is generated by the interaction network. The propagation network propagates the mask estimation for the object in the one image frame to the object in other image frames (e.g., different image frames than the one image frame) of the video sequence. To illustrate the operation of an interaction network and a propagation network including interaction encoder module 152 and interaction decoder module 154, and propagation encoder module 158 and propagation decoder module 160, respectively, consider FIG. 2A and FIG. 2B.

Figure 2A:
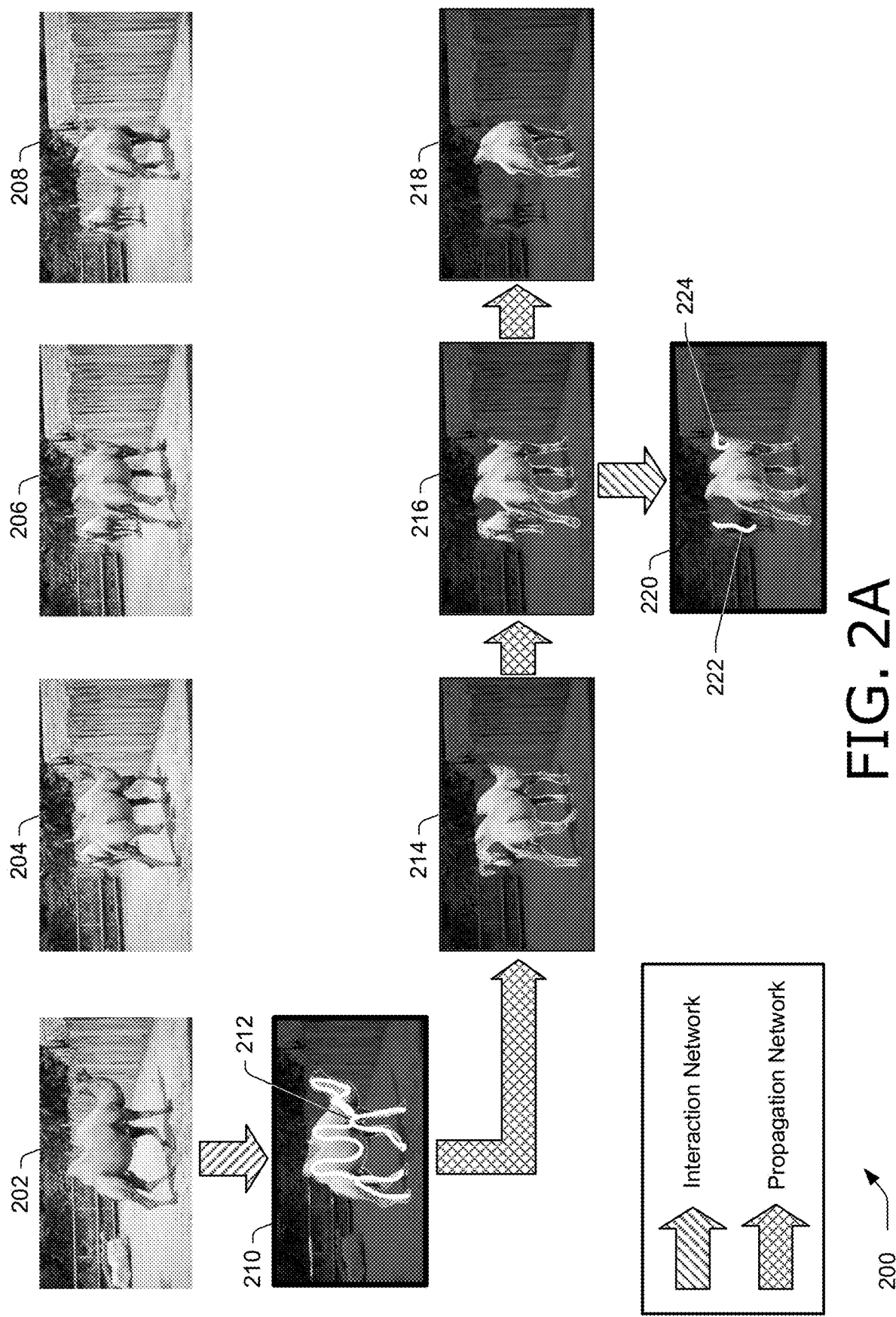
FIG. 2A illustrates example images in accordance with one or more aspects of the disclosure.
Figure 2B:
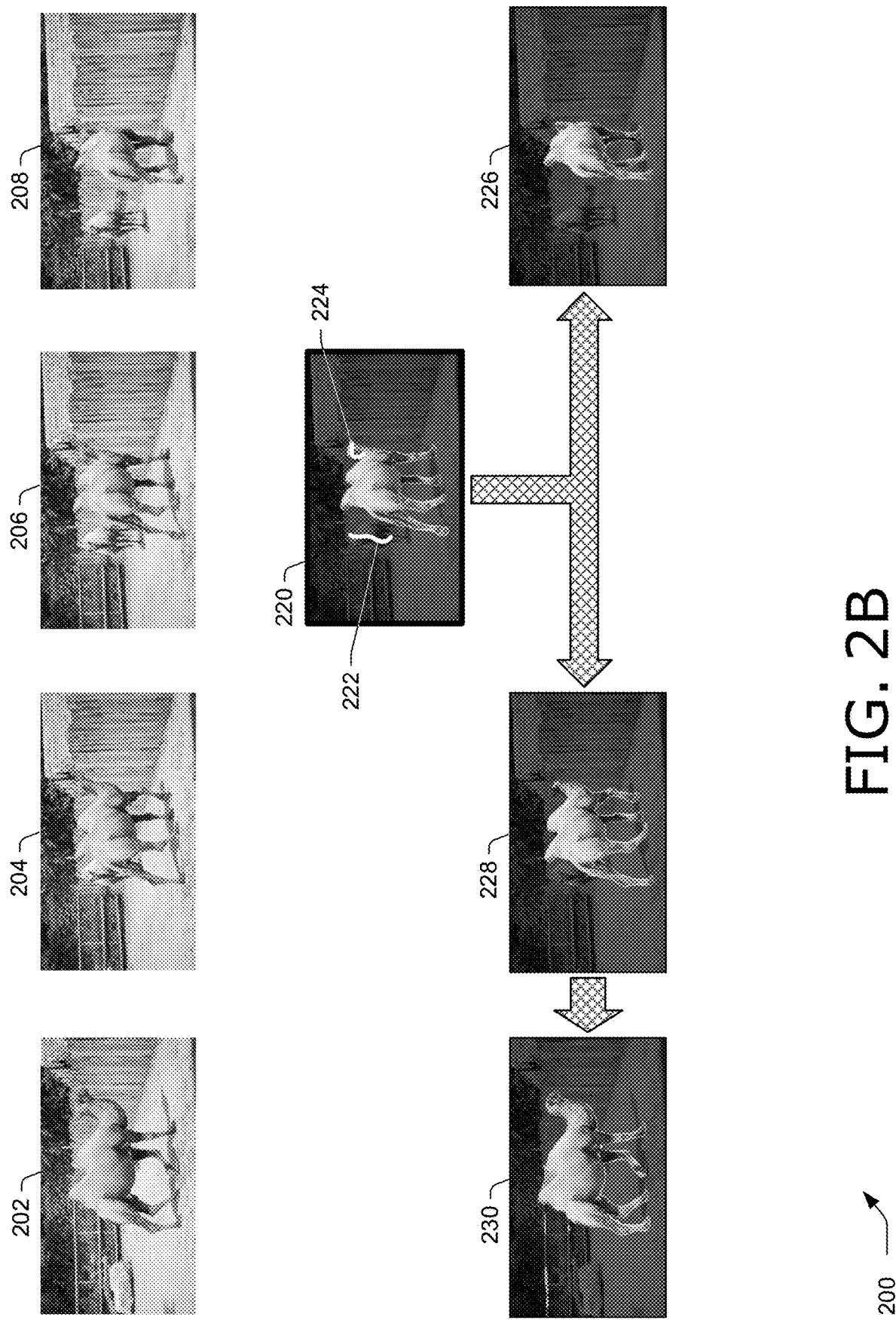
FIG. 2B illustrates example images in accordance with one or more aspects of the disclosure.

FIG. 2A and FIG. 2B illustrate example images 200 in accordance with one or more aspects of the disclosure. FIG. 2B is a continuation of FIG. 2A, and is shown separately for clarity. Images 200 include image frames of a video sequence, including image frame 202, image frame 204, image frame 206, and image frame 208. Images 200 illustrate mask generation and propagation in response to two rounds of user annotations to the video sequence. Note that actions for the interaction network are illustrated with arrows filled with a diagonal pattern, and actions for the propagation network are illustrated with arrows filled with a cross-hatch pattern.

In FIG. 2A, mask image 210 illustrates a mask generated for an object (e.g., a camel) in image frame 202. Mask image includes user annotation 212, including a scribble on top of the camel in a first round of user annotations. User annotation 212 can be applied to image frame 202 or mask image 210. In one example, user annotation 212 is applied by a user to image frame 202 that is exposed in a user interface. For instance, user annotation 212 may be a first annotation applied to a video sequence to segment an object. Additionally or alternatively, user annotation 212 can be applied by a user to mask image 210 that is exposed in a user interface. For instance, user annotation 212 may be an additional annotation applied to a video sequence to segment an object after a previous annotation.

In response to user annotation 212, the interaction network generates a mask for the camel illustrated in mask image 210, and provides mask image 210 to the propagation network. The propagation network propagates the mask for the camel in mask image 210 to image frame 204, image frame 206, and image frame 208, and generates mask image 214, mask image 216, and mask image 218. Mask image 214 corresponds to image frame 204, mask image 216 corresponds to image frame 206, and mask image 218 corresponds to image frame 208.

In a second round of user annotations, a user applies user annotations to mask image 216, and the interaction network generates mask image 220. Mask image 216 is a version of image frame 206 in which the mask for the object (e.g., the camel) is segmented from the background of the image. The user annotations can be applied to image frame 206, mask image 216, or combinations thereof. For instance, a user may select a toggle switch in a user interface to switch between display of image frame 206 and mask image 216, and apply user annotations to one or both of these images.

In the second round of user annotations, user annotation 222 is a negative annotation, because it identifies a second camel that is not intended by the user to be included in the mask for the camel illustrated by the previous user annotation (e.g., user annotation 212). The second round of user annotations also includes user annotation 224, which is a positive annotation because it identifies the same camel that is intended by the user to be included in the mask illustrated by the previous user annotation (e.g., user annotation 212). For instance, user annotation 224 indicates that the camel's head is to be included in the target object mask. Positive and negative annotations can be distinguished in any suitable way. For instance, a user may select a control option in a user interface to designate a user annotation as positive or negative, such as a "positive/negative" switch, a color or style of a marker (e.g., black or solid denotes positive, and white or dashed denotes negative, etc.). Based on user annotation 222 and user annotation 224, the interaction network generates mask image 220, which refines the mask of mask image 216. The example is continued in FIG. 2B.

In FIG. 2B, image frame 202, image frame 204, image frame 206, image frame 208, and mask image 220 are repeated from FIG. 2A for clarity. In FIG. 2B, the interaction network provides mask image 220 generated in response to a second round of user annotations to the propagation network. The propagation network propagates the mask for the object in mask image 220 to other image frames than image frame 206, and generates mask image 226 that corresponds to image frame 208, mask image 228 that corresponds to image frame 204, and mask image 230 that corresponds to image frame 202. In these mask images generated based on the second round of user annotations, the camel is accurately segmented from the image in each of the image frames, indicated by the masks of mask image 220, mask image 226, mask image 228, and mask image 230.

The example in FIG. 2A and FIG. 2B illustrates how a user can provide a user annotation to any suitable image frame in a video sequence, in any suitable order. For instance, the user is not required to provide user annotations to any particular image frame, such as a first or last image frame in a video sequence, but rather can provide any number of user annotations to any image frame of a video sequence. The interaction network and the propagation network work together to generate and propagate a mask for a target object to all image frames of the video sequence based on user annotations to one or more image frames.

Returning to FIG. 1, user interface module 150 is representative of functionality configured to generate and expose a user interface for segmenting objects in video sequences. User interface module 150 can generate and expose any suitable user interface in any suitable way. In one example, user interface module 150 is configured to expose image frames of a video sequence, including mask images, and receive annotations, such as user annotations and synthetically-generated annotations. Annotations may include positive and negative annotations. User annotations may be any suitable annotation, such as a scribble, paintbrush stroke, bounding shape (e.g., a bounding box or free-form enclosure), to at least partially indicate an object. For instance, a user may scribble with a cursor a few connected line segments within an object to indicate the entire object.

In one example, user interface module 150 generates a positive image and a negative image from annotations received by user interface module 150. For instance, user interface module 150 may receive both positive and negative annotations on top of an image frame or mask image of an image frame, and generate a positive image corresponding to the positive annotations and a negative image corresponding to the negative annotations. A positive image retains positive annotations and removes negative annotations, and a negative image retains negative annotations and removes positive annotations.

User interface module 150 may also obtain and expose previously-generated masks and mask images. For instance, user interface module 150 may expose a previously-generated mask image for a currently-selected image frame, such as an image frame selected by a user. Additionally or alternatively, user interface module 150 may expose an initialization image when a previously-generated mask image is unavailable. For instance, when a user has not provided any annotations to segment an object in a video sequence, a user interface generated by user interface module 150 may expose an option to set pixels of an initialization image to a value, such as 0.5 (e.g., all pixels of a mask image may be set to a value of 0.5), and expose the initialization image. A user may select the initialization value with a slider control, e.g., a slider that moves continuously between zero and one.

In one example, user interface module 150 includes a region-of-interest control setting. For instance, a user may enable a region-of-interest control setting to designate a region-of-interest for an object in an image frame. When enabled, user interface module 150 may determine a region-of-interest for an object by computing a tight bounding box that includes a user annotation for an object (e.g., a positive annotation). A region-of-interest is determined from the tight bounding box by expanding the tight bounding box. The tight bounding box can be expanded in any suitable way, such as scaling the width and height of the tight bounding box. In one example, user interface module 150 doubles the height and width of a tight bounding box to determine a region-of-interest. Based on the region-of-interest, user interface module 150 may scale an image frame, mask image, or both so as to include the region-of-interest while excluding areas of an image frame not included in the region-of-interest. For instance, user interface module 150 may crop an image frame to the region-of-interest.

User interfaces generated and exposed by user interface module 150, along with any suitable information, such as a user preferences, options selected by a user, user annotations, positive images, negative images, image frames of a video sequence, mask images of image frames of a video sequence, synthetically-generated annotations used for training an object segmentation system, an indication of a method of obtaining synthetically-generated annotations (e.g., random walk, skeletization, etc.), a region-of-interest of an object, a scaled image frame or mask image based on a region-of-interest, combinations thereof, and the like, used by or calculated by user interface module 150 are stored in user interface data 136 of storage 134 and made available to modules of object segmentation application 112. In one example, user interface module 150 exposes image frames of a video sequence, receives user annotations, and provides positive and negative images corresponding to the user annotations to interaction encoder module 152.

Interaction encoder module 152 is representative of functionality configured to extract features for an object from an image frame into a feature map. Interaction encoder module 152 and interaction decoder module 154 include an encoder network and a decoder network, respectively, of an encoder-decoder structure included in an interaction network. In one example, interaction encoder module 152 includes a ResNet50 encoder network as described in "Deep residual learning for image recognition", *Proceedings of the IEEE Conference on Computer Vision and Pattern Recognition*, 2016, pp. 770-778, by K. He et al., the disclosure of which is incorporated herein by reference in its entirety. A ResNet50 of interaction encoder module 152 may be modified by removing the last global pooling and fully-connected layers, and modifying it to accept additional input channels by adding filters at the first convolutional layer, as described in "Learning video object segmentation from static images", *Proceedings of the IEEE Conference on Computer Vision* and *Pattern Recognition*, 2017, pp. 2663-2672, by F. Perazzi et al., the disclosure of which is incorporated herein by reference in its entirety.

Interaction encoder module 152 receives an image frame, e.g., an image frame for which a user has provided user annotations, and a previously-generated mask image for the image frame, if available. If a previously-generated mask image for the image frame is unavailable, an initialization mask image may be generated and used, such as a neutral mask filled with values of 0.5 for all pixels, or a mask filled with user-selected values. Interaction encoder module 152 also receives a positive image and a negative image corresponding to positive user annotations and negative user annotations, respectively, from user interface module 150. In one example, each of these images provided to interaction encoder module 152 are of a same size. Additionally or alternatively, these images provided to interaction encoder module 152 may be scaled (e.g., cropped) based on a region-of-interest.

The images provided to interaction encoder module 152 are concatenated along the channel dimension of the encoder network to form an input tensor $$X \in \mathbb{R}^{6 \times H \times W}$$

where H and W are a respective height and a respective width of the images provided to interaction encoder module 152. Three of the six channels include an image frame, such as RGB channels of the image frame, two of the six channels include positive and negative images for positive and negative user annotations, respectively, and the remaining channel of the six channels includes a previously-generated mask image for the image frame, if available, or if unavailable, an initialization mask. A mask image can include values in the range [0, 1] and represent a probability of each pixel belonging to a target object. Based on these inputs, an encoder network of interaction encoder module 152 generates at least one feature map.

Interaction encoder module 152 can include any suitable encoder network that includes any suitable number of layers to generate any suitable number of feature maps. At each layer of the encoder network, interaction encoder module 152 extracts features of an image frame. Later layers may downsample by a factor, such as two, relative to an adjacent earlier layer in the encoder network. Earlier layers of the encoder network extract lower level features, such as edges and corners, and later layers of the encoder network extract higher level features, such as texture and fine detail. To fully exploit the features extracted at different scales (e.g., levels), an encoder network of interaction encoder module 152 includes skip connections that provide intermediate feature maps from different layers of the encoder network to respective layers of a decoder network of interaction decoder module 154. Hence, a decoder network of interaction decoder module 154 may not only receive a current feature map generated by a last layer of an encoder network of interaction encoder module 152, but also intermediate feature maps generated by intermediate layers of the encoder network of interaction encoder module 152.

Feature maps generated by interaction encoder module 152, along with any suitable information, such as intermediate feature maps generated by intermediate layers of an encoder network, a current feature map generated by a final layer of an encoder network, weights of an encoder network, an image frame, a mask image corresponding to an image frame, an indication whether a mask image is an initialization image, a value of pixels in an initialization image, positive images of positive user annotations, negative images of negative user annotations, an indicator of an image frame such as a frame number in a video sequence, combinations thereof, and the like, used by or calculated by interaction encoder module 152 are stored in interaction network data 138 of storage 134 and made available to modules of object segmentation application 112. In one example, interaction encoder module 152 provides a current feature map generated by a last layer of an encoder network of interaction encoder module 152 to interaction decoder module 154 and feature aggregation module 156. Additionally or alternatively, interaction encoder module 152 can provide intermediate feature maps generated by intermediate layers of an encoder network of interaction encoder module 152 to interaction decoder module 154.

Interaction decoder module 154 is representative of functionality configured to generate a mask estimation for an object in an image frame based on a feature map provided by interaction encoder module 152, such as a current feature map generated by a last layer of an encoder network of interaction encoder module 152. Interaction decoder module 154 includes a decoder network that is complementary to an encoder network of interaction encoder module 152, as described above. Later layers of a decoder network may upsample by a factor, such as two, relative to an adjacent earlier layer in the decoder network. To fully exploit the features extracted at different scales in the encoder network and generate an accurate mask estimation, the decoder network of interaction decoder module 154 receives intermediate feature maps via skip connections. Hence, a decoder network of interaction decoder module 154 may not only receive a current feature map generated by a last layer of an encoder network of interaction encoder module 152, but also intermediate feature maps generated by intermediate layers of the encoder network of interaction encoder module 152.

Figure 3:
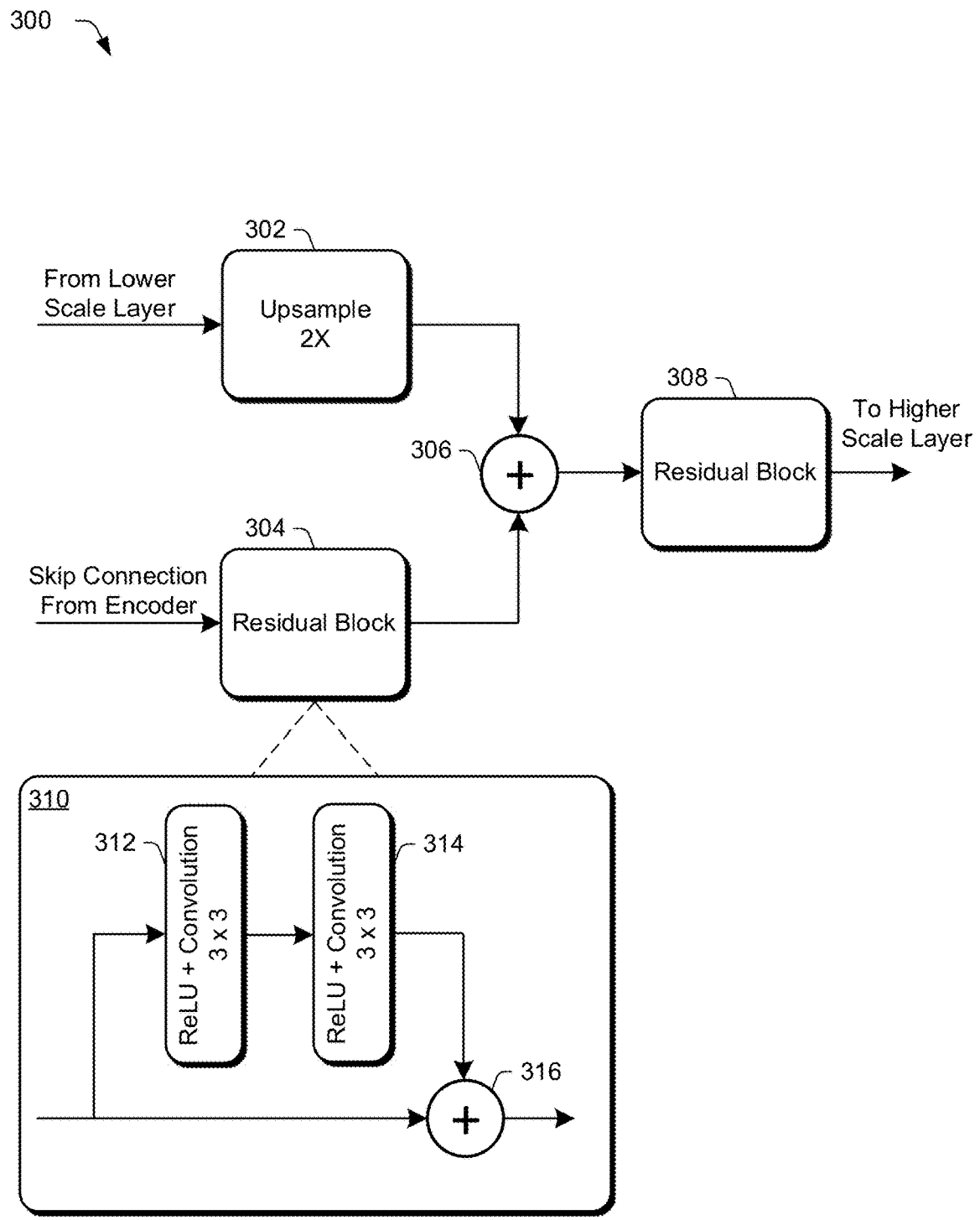
FIG. 3 illustrates an example decoder block in accordance with one or more aspects of the disclosure.

FIG. 3 illustrates an example decoder block 300 in accordance with one or more aspects of the disclosure. Decoder block 300 is an example of a block that can be used at any layer of a decoder network of interaction decoder module 154, enabling each layer of the decoder network to receive inputs from an earlier layer as well as inputs via a skip connection from an encoder network of interaction encoder module 152.

Decoder block 300 includes upsample block 302, which receives an input from an earlier layer of a decoder network of interaction decoder module 154. Note that for a first (e.g., earliest) layer of the decoder network, where there is no earlier layer of the decoder block, upsample block 302 receives a current feature map generated by a last layer of an encoder network of interaction encoder module 152. Upsample block 302 upsamples by a factor, such as two, matching the downsample factor of the layers of the encoder network of interaction encoder module 152.

Decoder block 300 also includes residual block 304 (discussed below in more detail), which receives an intermediate feature map via a skip connection from a corresponding layer of an encoder network of interaction encoder module 152. The outputs of upsample block 302 and residual block 304 are summed element-wise (e.g., element-by-element) in adder 306, and the result is provided to another residual block 308. The output of residual block 308 is provided to the next layer of the decoder network of interaction decoder module 154.

Details of residual block 304 and residual block 308 are illustrated at block 310. For instance, block 310 includes circuitry that can be included in residual block 304 and residual block 308. An input to block 310 is processed by a processing block 312, whose output is processed by processing block 314. Processing block 312 and processing block 314 include rectifier linear units (ReLU's) and 3×3 convolutions. The output of processing block 314 and an input to block 310 are summed element-wise at adder 316.

Returning again to FIG. 1, a mask estimation generated by interaction decoder module 154, along with any suitable information, such as intermediate feature maps generated by intermediate layers of an encoder network, a current feature map generated by a final layer of an encoder network, weights of a decoder network, image frame indicators, combinations thereof, and the like, used by or calculated by interaction decoder module 154 are stored in interaction network data 138 of storage 134 and made available to modules of object segmentation application 112. In one example, interaction decoder module 154 provides a mask estimation for an image frame annotated by a user to propagation encoder module 158.

Feature aggregation module 156 is representative of functionality configured to accumulate feature maps. Because a user may provide multiple rounds of user annotations in different image frames of a video sequence, feature aggregation module 156 accumulates information from each of these rounds of user annotations into an aggregated feature map. For instance, for each round of user annotations (e.g., for each set of user annotations provided for an image frame), feature aggregation module 156 receives a current feature map from interaction encoder module 152 and accumulates features of the current feature map with a history of features into an aggregated feature map.

Feature aggregation module 156 can generate an aggregated feature map in any suitable way. In one example, feature aggregation module 156 includes an integration system for accumulating feature maps, which stores a previously-generated aggregated feature map and merges its features with features of a current feature map from interaction encoder module 152. For instance, FIG. 4 includes an example of an integration system for accumulating feature maps.

Figure 4:
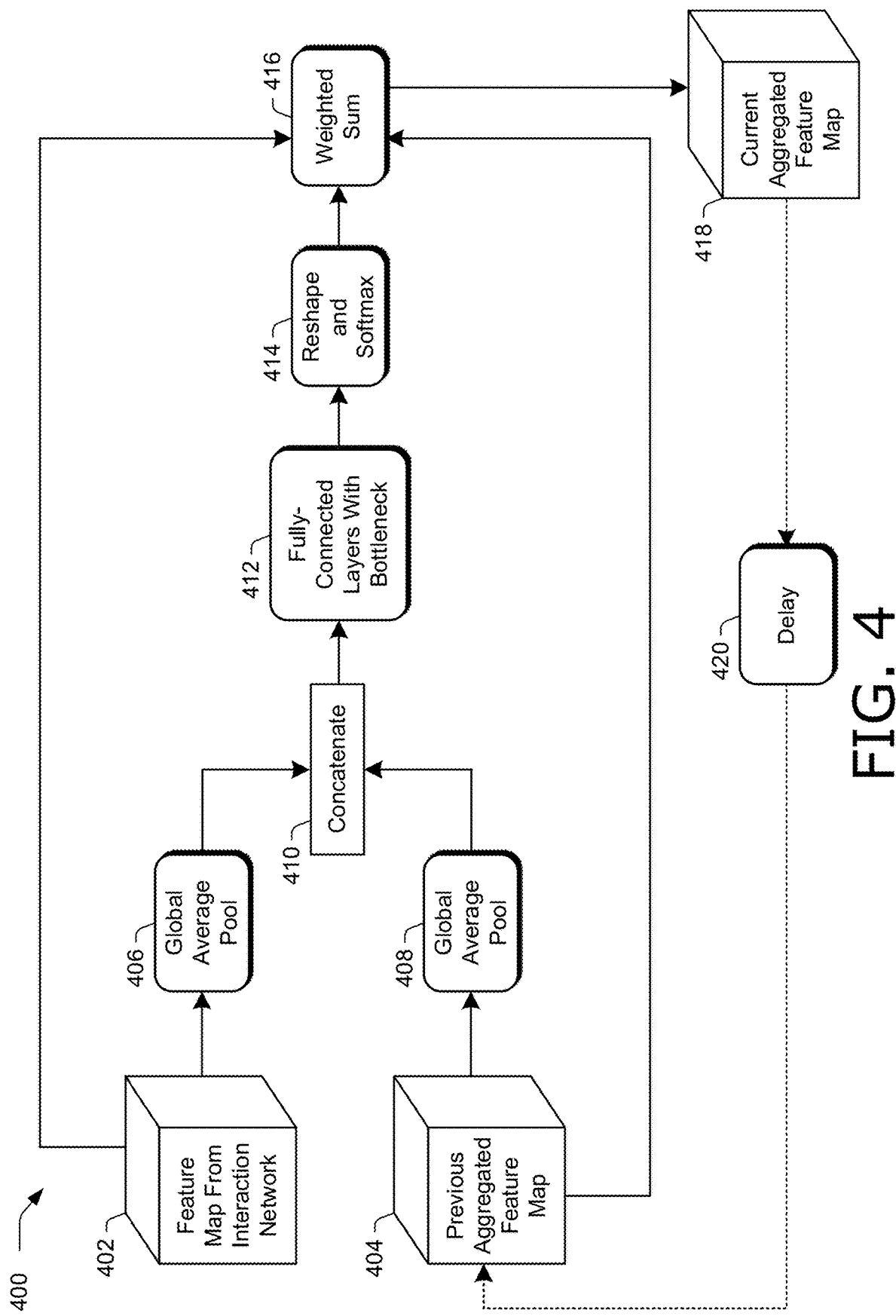
FIG. 4 illustrates an example feature aggregation system in accordance with one or more aspects of the disclosure.

FIG. 4 illustrates an example feature aggregation system 400 in accordance with one or more aspects of the disclosure. Feature aggregation system 400 is an example of a system included in feature aggregation module 156 to accumulate feature maps. Feature aggregation system 400 receives feature map 402, an example of a current feature map (e.g., corresponding to a current user annotation for an image frame) from interaction encoder module 152. In one example, feature map 402 includes a current feature map generated by a final layer of an encoder network of interaction encoder module 152.

Feature aggregation system 400 also obtains a previously-generated aggregated feature map 404. Previously-generated aggregated feature map 404 may be an aggregated feature map that has been previously generated by feature aggregation system 400 corresponding to previous user annotations, and stored in storage, such as in storage 134.

Feature map 402 and previously-generated aggregated feature map 404 can be any suitable size. In one example, feature map 402 and previously-generated aggregated feature map 404 are each three-dimensional feature maps, with dimensions P×M×N, where P denotes the number of channels, M denotes a width of the feature map, and N denotes a height of a feature map. For instance, feature map 402 and previously-generated aggregated feature map 404 may each be 2048×8×8 in size.

Feature map 402 and previously-generated aggregated feature map 404 are provided to global average pool 406 and global average pool 408, respectively. Global average pool 406 and global average pool 408 each average over spatial dimensions M and N, producing respective feature vectors of length P. For instance, global average pool 406 produces a first length-P feature vector for feature map 402, and global average pool 408 produces a second length-P feature vector for previously-generated aggregated feature map 404.

Respective feature vectors from global average pool 406 and global average pool 408 are concatenated in concatenation block 410. For instance, concatenation block 410 forms a concatenated feature vector of length-2P. Concatenation block 410 provides a concatenated feature vector to fully-connected layers with bottleneck 412. In one example, fully-connected layers with bottleneck 412 includes two layers connected via a bottleneck layer. For instance, the bottleneck layer may reduce the dimensionality from length-2P to P. Fully-connected layers with bottleneck 412 generates two channel-wise weight vectors that are processed by reshape and softmax block 414 to yield the channel-wise weight vectors $\alpha$ and $\beta$, each of length P. Reshape and softmax block 414 ensures that the channel-wise weight vectors sum to unity, or $\alpha + \beta = 1$.

Weighted sum 416 receives weight vectors $\alpha$ and $\beta$ from reshape and softmax block 414, as well as feature map 402 and previously-genreated aggregated feature map 404, and merges the feature maps into current aggregated feature map 418 by forming a weighted sum of feature map 402 and previously-generated aggregated feature map 404. Weights of the weighted sum are determined from the channel-wise weight vectors $\alpha$ and $\beta$. For instance, Weighted sum 416 may generate a current aggregated feature map 418 according to $$A_r = \alpha \odot A_{r-1} + \beta \odot R_r$$

where $A_r$ denotes current aggregated feature map 418, $A_{r-1}$ denotes previously-generated aggregated feature map 404, $R_r$ denotes feature map 402, and $\odot$ denotes element-by-element multiplication along the channel dimension. Current aggregated feature map 418 is provided to delay 420. Delay 420 includes memory of storage 134, which stores the current aggregated feature map 418 to be used as a previous aggregated feature map when a new user annotation is received.

Returning again to FIG. 1, an aggregated feature map generated by feature aggregation module 156, along with any suitable information, such as a previously-generated aggregated feature map, a currently-updated aggregated feature map, a current feature map provided by interaction encoder module 152, feature vectors, channel-wise weight vectors, combinations thereof, and the like, used by or calculated by feature aggregation module 156 are stored in feature aggregation data 142 of storage 134 and made available to modules of object segmentation application 112. In one example, feature aggregation module 156 provides an aggregated feature map to propagation decoder module 160.

Propagation encoder module 158 is representative of functionality configured to extract features for an object in an image frame of a video sequence, such as a different image frame than an image frame for which a user has provided current user annotations to designate the object.

Propagation encoder module 158 and propagation decoder module 160 include an encoder network and a decoder network, respectively, of an encoder-decoder structure included in a propagation network. In one example, propagation encoder module 158 includes a ResNet50 encoder network as described above. A ResNet50 may be modified by removing the last global pooling and fully-connected layers, and modifying it to accept additional input channels. For instance, propagation encoder module 158 receives three images: an image frame, a mask image for the image frame from a previous round of user annotations, and a mask image for a different image frame from a current round of user annotations.

Propagation encoder module 158 receives an image frame, e.g., a different image frame than an image frame for which a user has provided user annotations in a current round of user annotations. Propagation encoder module 158 also receives a previously-generated mask image for an image frame that is provided to propagation encoder module 158, if available. If a previously-generated mask image is unavailable, an initialization mask image may be generated and used, such as a neutral mask filled with values of 0.5 for all pixels, or a mask filled with user-selected values. Propagation encoder module 158 also receives a mask image for a current round of user annotations, the mask image corresponding to a different image frame in the video sequence than the image frame provided to propagation encoder module 158. In one example, a mask image is provided to propagation encoder module 158 from interaction decoder module 154, such as a mask estimation generated by interaction decoder module 154 for an image frame annotated by a user. Additionally or alternatively, propagation encoder module 158 may obtain a mask image for a different image frame in the video sequence than the image frame provided to propagation encoder module 158 by propagating a mask estimation generated by interaction decoder module 154 for an image frame to a different image frame.

In one example, each of the three images provided to propagation encoder module 158 are of a same size. Additionally or alternatively, the images provided to propagation encoder module 158 may be scaled (e.g., cropped) based on a region-of-interest, as described above.

The three images provided to propagation encoder module 158 are concatenated along the channel dimension of the encoder network to form an input tensor $$x \in \mathbb{R}^{5 \times H \times W}$$

where H and W are a respective height and a respective width of the images provided to propagation encoder module 158. Three of the five channels include an image frame, such as RGB channels of the image frame, one of the five channels include a previously-generated mask image for the image frame (e.g., from a previous round of user annotations), if available, or if unavailable, an initialization mask. The remaining channel includes a mask image for a different image frame from a current round of user annotations. Based on these inputs, an encoder network of propagation encoder module 158 generates at least one feature map.

Propagation encoder module 158 can include any suitable encoder network that includes any suitable number of layers to generate any suitable number of feature maps. In one example, propagation encoder module 158 includes a same encoder network as an encoder network of interaction encoder module 152. To fully exploit the features extracted at different scales (e.g., levels), an encoder network of propagation encoder module 158 may include skip connections to respective layers of a decoder network of propagation decoder module 160, which operate as described above. Hence, a decoder network of propagation decoder module 160 may not only receive a current feature map generated by a last layer of an encoder network of propagation encoder module 158, but also intermediate feature maps generated by intermediate layers of the encoder network of propagation encoder module 158.

Feature maps generated by propagation encoder module 158, along with any suitable information, such as intermediate feature maps generated by intermediate layers of an encoder network, a current feature map generated by a final layer of an encoder network, weights of an encoder network, an image frame, a mask image corresponding to an image frame, an indication whether a mask image is an initialization image, a value of pixels in an initialization image, an indicator of an image frame such as a frame number in a video sequence), combinations thereof, and the like, used by or calculated by propagation encoder module 158 are stored in propagation network data 140 of storage 134 and made available to modules of object segmentation application 112. In one example, propagation encoder module 158 provides a current feature map generated by a last layer of an encoder network of propagation encoder module 158 to propagation decoder module 160. Additionally or alternatively, propagation encoder module 158 may provide intermediate feature maps via skip connections to propagation decoder module 160.

Propagation decoder module 160 is representative of functionality configured to propagate a mask estimation for an object in one image frame to other image frames of a video sequence. Hence, propagation decoder module 160 can generate a mask estimation for each image frame of a video sequence for which a user has not provided annotations in a current round of user annotations. Propagation decoder module 160 includes a decoder network that is complementary to an encoder network of propagation encoder module 158. Later layers of a decoder network may upsample by a factor, such as two, relative to an adjacent earlier layer in the decoder network.

Propagation decoder module 160 receives a current feature map generated by a last layer of a propagation network of propagation encoder module 158 (also called a propagation feature map), and an aggregated feature map from feature aggregation module 156, and concatenates these feature maps along the channel dimension into a concatenated feature map. To fully exploit the features extracted at different scales in the encoder network, the decoder network of propagation decoder module 160 may also receive intermediate feature maps via skip connections. Hence, a decoder network of propagation decoder module 160 may include decoder blocks like decoder block 300 in FIG. 3, as previously discussed, to not only process a concatenated feature map, but also intermediate feature maps generated by intermediate layers of the encoder network of propagation encoder module 158.

Figure 5:
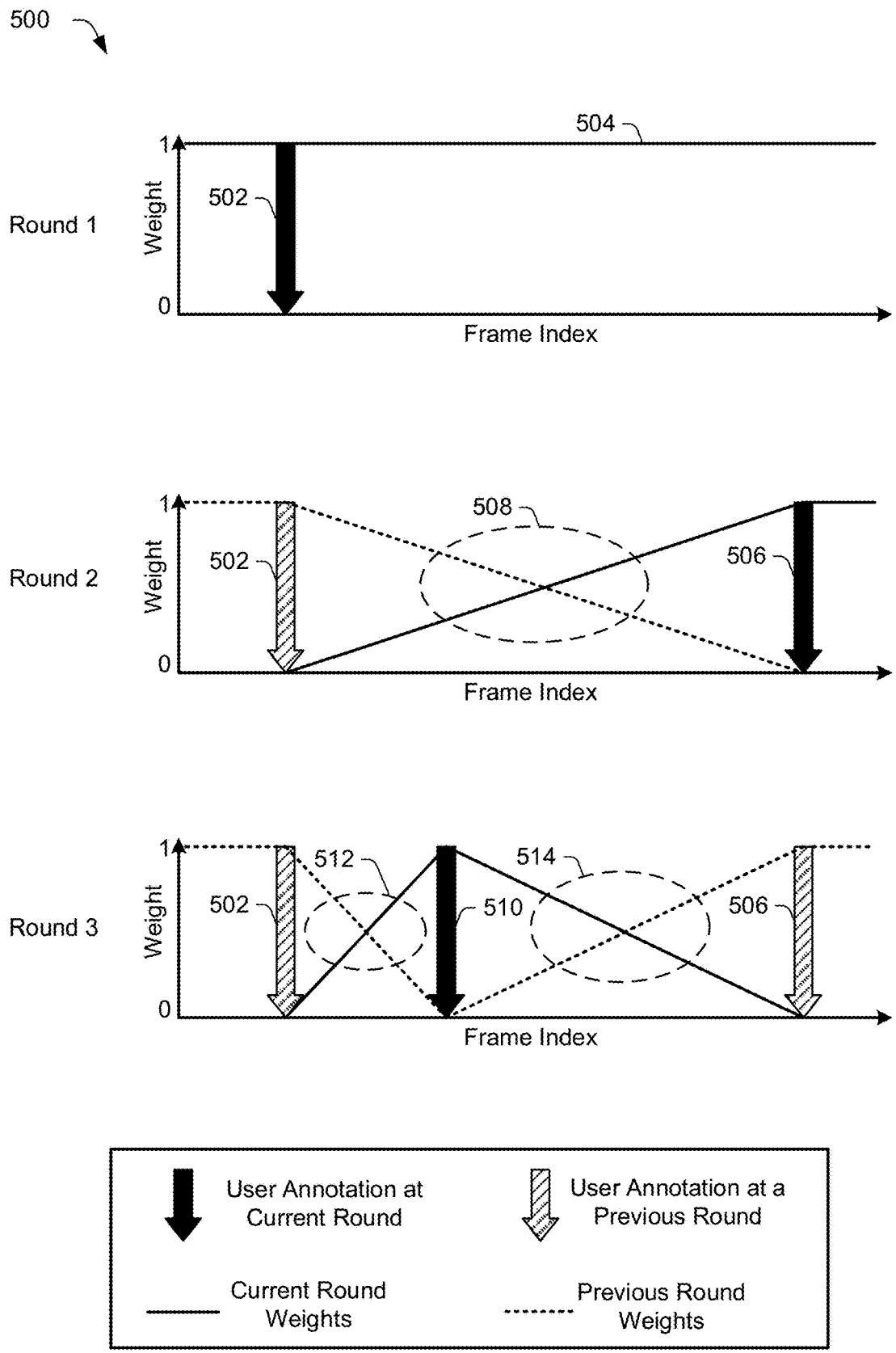
FIG. 5 illustrates example mask propagation in accordance with one or more aspects of the disclosure.

Propagation decoder module 160 can propagate a mask estimation to different image frames and generate mask estimations for the different image frames in any suitable way. In one example, propagation decoder module 160 propagates a mask estimation based on combining masks from a current round of user annotations with masks generated for a previous round of user annotations. For instance, FIG. 5 illustrates example mask propagation 500 in accordance with one or more aspects of the disclosure. Mask propagation 500 is an example of propagating masks by combining masks from different rounds of user annotations, with combining weights determined from a distance between frame images in a video sequence (e.g., a difference in frame numbers). In one example, propagation decoder module 160 propagates masks as is described by mask propagation 500.

Mask propagation 500 includes three rounds of user annotations. In each round of user annotations, a user provides a user annotation to a different image frame in the video sequence. A current mask for an image frame (e.g., generated for a current round of user annotations) is linearly combined with a previous mask for the image frame (e.g., a generated for a previous round of user annotations).

In a first round, a user annotation is provided to a first image frame at 502, and the mask for this image frame is propagated to all other image frames, such as by a propagation network of object segmentation system 110. Since there is no previous round of user annotations relative to this first round, the masks for each image frame are not combined with previous masks of the image frames. Hence, the current-round weights, shown in solid line 504, are set to one, and the previous-round weights are zeroed.

In a second round, a user annotation is provided to a second image frame at 506, which is a different image frame than the image frame for which the first round of user annotations was provided. A mask is generated for the second image frame and propagated to other image frames of the video sequence. However, for image frames between the first image frame at 502 (where the user applied the first round of user annotations) and the second image frame at 506 (where the user applied the second round of user annotations) in the video sequence, the image frames are propagated by combining a previously-generated mask for an image frame (e.g. a mask generated at the first round) with the currently-generated mask for the image frame (e.g., a mask generated at the second round), as shown at ellipse 508. The combining weights are chosen to be inversely proportional to the distance between the first image frame and the second image frame. For instance, in ellipse 508, more weight is given to a currently-generated mask than a previously-generated mask for those image frames closer to the second image frame at 506 than the first image frame at 502. Conversely, less weight is given to a currently-generated mask than a previously-generated mask for those image frames closer to the first image frame at 502 than the second image frame at 506.

In a third round, a user annotation is provided to a third image frame at 510, which is a different image frame than the image frames for which the first and second round of user annotations was provided. A mask is generated for the third image frame and propagated to other image frames of the video sequence. However, for image frames between the first image frame at 502 (where the user applied the first round of user annotations) and the third image frame at 510 (where the user applied the third round of user annotations) in the video sequence, the image frames are propagated by combining a previously-generated mask for an image frame (e.g., a mask generated at the second round) with the currently-generated mask for the image frame (e.g., a mask generated at the third round), as shown at ellipse 512. Moreover, for image frames between the second image frame at 506 (where the user applied the second round of user annotations) and the third image frame at 510 (where the user applied the third round of user annotations) in the video sequence, the image frames are propagated by combining a previously-generated mask for an image frame (e.g., a mask generated at the second round) with the currently-generated mask for the image frame (e.g., a mask generated at the third round), as shown at ellipse 514.

By combining currently-generated masks for an image frame with previously-generated masks for the image frame, errors in propagating masks to image frames of a video sequence are reduced, and reliable masks are generated that accurately correspond to target objects.

Returning again to FIG. 1, mask estimations generated by propagation decoder module 160, along with any suitable information, such as intermediate feature maps generated by intermediate layers of an encoder network, a current feature map generated by a final layer of an encoder network, a concatenated feature map, weights of a decoder network, combining weights of current and previous masks, combinations thereof, and the like, used by or calculated by propagation decoder module 160 are stored in propagation network data 140 of storage 134 and made available to modules of object segmentation application 112. In one example, propagation decoder module 160 provides a mask estimation for each image frame of a video sequence to user interface module 150, which exposes mask images including mask estimations for each image frame.

Training module 162 is representative of functionality configured to train one or more networks of object segmentation system 110. Training module 162 can train any suitable network in any suitable way. In one example, training module 162 trains an interaction network and a propagation network jointly. An interaction network may include interaction encoder module 152 and interaction decoder module 154, and a propagation network may include propagation encoder module 158 and propagation decoder module 160. In one example, training module 162 trains an interaction network and a propagation network jointly in a multi-round training scenario, as illustrated in FIG. 6

Figure 6:
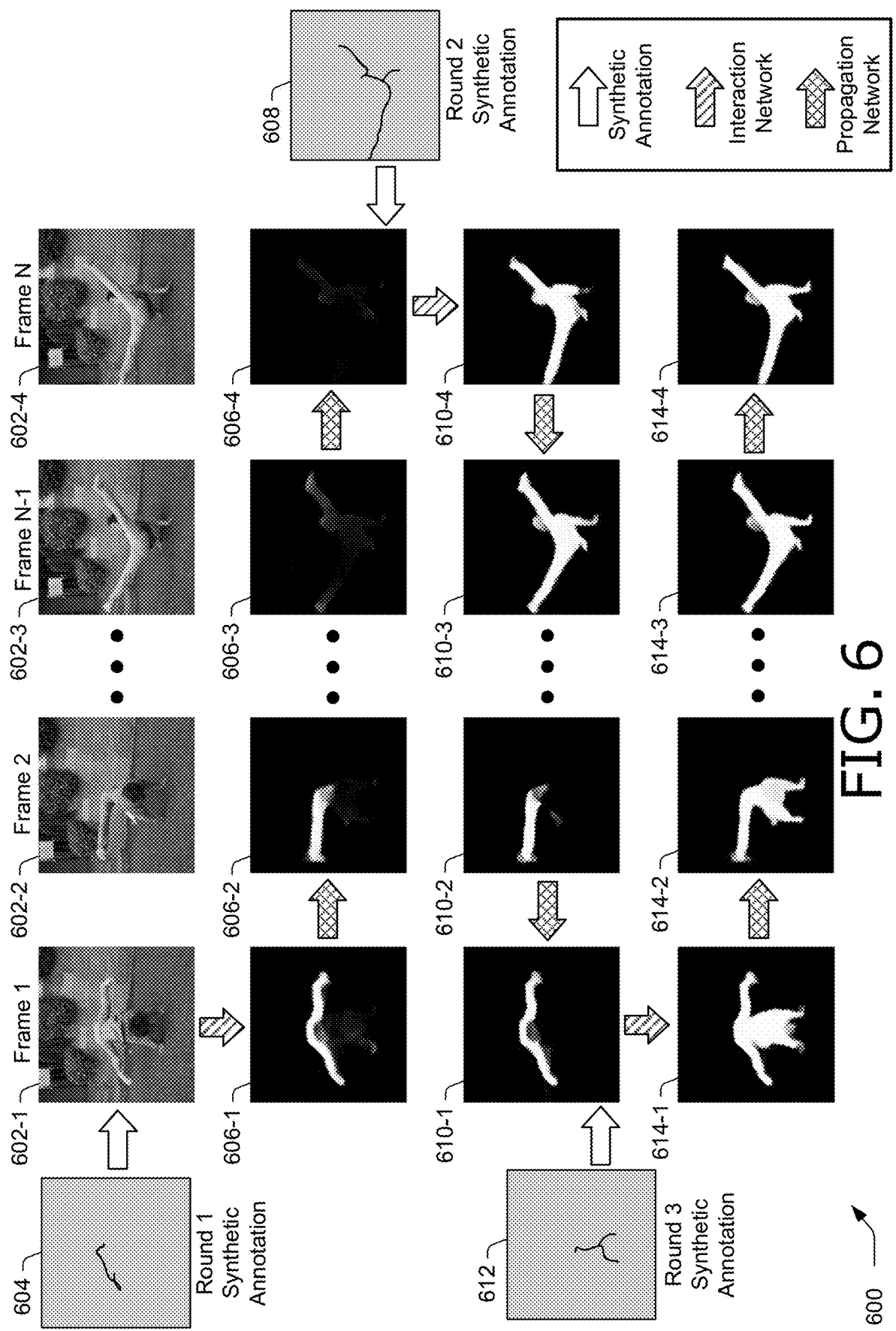
FIG. 6 illustrates example multi-round training in accordance with one or more aspects of the disclosure.

FIG. 6 illustrates example multi-round training 600 in accordance with one or more aspects of the disclosure. Multi-round training 600 is an example of a multi-round training scheme in which a single training sample (e.g., a single training iteration including updating weights of a network) consists of multiple rounds of interactions (e.g., synthetic annotations representing user annotations for respective image frames).

Multi-round training 600 includes four image frames of a video sequence, including image frame 602-1 denoting frame 1 of the video sequence, image frame 602-2 denoting frame 2 of the video sequence, image frame 602-3 denoting frame N−1 of the video sequence, and image frame 602-4 denoting frame N of the video sequence.

In a first round of annotations, synthetic annotation 604 is provided as input to an interaction network, such as an interaction network including interaction encoder module 152 and interaction decoder module 154. Synthetic annotation 604 is an example of an annotation that is synthetically-generated and used in place of a user annotation. Synthetic annotation 604 can be generated in any suitable way. In one example, synthetic annotation 604 is generated automatically and without user intervention by selecting a seed pixel within an area in an image frame including an object, and generating a random walk. The angle of the random walk may be randomly initialized with any direction, and steered within a narrower angle that is randomly selected at each step. The step size can be determined based on the size of the area, so that the synthetically-generated annotation stays within the area. Additionally or alternatively, synthetic annotation 604 can be generated with a skeletization algorithm. For instance, an area in an image frame that includes an object may be determined, and a skeleton generated for the area by successively thinning pixels of the area until a skeleton remains. In the example in FIG. 6, synthetic annotation 604 includes an annotation designating a person in image frame 602-1 as a target object.

Based on synthetic annotation 604, an interaction network generates mask image 606-1 corresponding to image frame 602-1. Mask images include values in a range (e.g., within the range [0, 1]) that represent a probability of each pixel in the mask image belonging to a target object. For instance, lighter pixels (e.g., more white) denotes pixels with higher probabilities of belonging to a target image than darker pixels (e.g., more black) in FIG. 6.

Based on mask image 606-1 generated by an interaction network, a propagation network, such as a propagation network including propagation encoder module 158 and propagation decoder module 160, propagates the mask of mask image 606-1 to image frame 602-2, image frame 602-3, and image frame 602-4 by generating respective mask images. For instance, the propagation network generates mask image 606-2 corresponding to image frame 602-2, mask image 606-3 corresponding to image frame 602-3, and mask image 606-4 corresponding to image frame 602-4.

In the example in FIG. 6, mask image 606-4 includes many dark pixels, indicating that its mask has a low probability of accurately representing the target object. Accordingly, training schemes that update network weights based on a single round of annotations and use poor-quality masks, such as mask image 606-4, may take excessively long to train by requiring large numbers of input-output pairs. Moreover, the learned model may not be reliable and may not produce masks that accurately represent target objects.

Accordingly, before updating weights of a network (e.g., an interaction network and a propagation network included in an object segmentation system), multi-round training 600 receives multiple synthetic annotations. For instance, multi-round training 600 receives synthetic annotation 608 for image frame 602-4 in a second round of annotations. Based on synthetic annotation 608, the interaction network generates mask image 610-4 corresponding to image frame 602-4. Based on mask image 610-4, the propagation network generates mask image 610-1 corresponding to image frame 602-1, mask image 610-2 corresponding to image frame 602-2, and mask image 610-3 corresponding to image frame 602-3.

In a third round of annotations, multi-round training 600 receives synthetic annotation 612 for image frame 602-1. Based on synthetic annotation 612, the interaction network generates mask image 614-1 corresponding to image frame 602-1. Based on mask image 614-1, the propagation network generates mask image 614-2 corresponding to image frame 602-2, mask image 614-3 corresponding to image frame 602-3, and mask image 614-4 corresponding to image frame 602-4.

In the example in FIG. 6, multi-round training 600 may update weights of the interaction network and the propagation network after receiving all three rounds of annotations, and once mask image 614-1, mask image 614-2, mask image 614-3, and mask image 614-4 are generated. Compared to the mask images generated after one round of annotations (e.g., mask image 606-1, mask image 606-2, mask image 606-3, and mask image 606-4), the mask images generated after the third round of annotations (e.g., mask image 614-1, mask image 614-2, mask image 614-3, and mask image 614-4) more accurately represent the target object in each image frame. Hence, an object segmentation system trained by a multi-round training scenario as described by multi-round training 600 learns network weights more quickly, and with more reliable weights that accurately segment objects, than an object segmentation system trained by updating weights after each round of annotations.

In one example, multi-round training 600 includes a two-stage training scenario, in which an object segmentation system is first trained using synthetically-generated annotations, such as synthetic annotation 604, synthetic annotation 608, and synthetic annotation 612. This first stage may also include synthetically-generated image frames. Once weights are learned using synthetically-generated annotations, a second stage of training may fine-tune the learned weights from the first stage of training using user annotations and video sequences including real image frames. In both first and second training stages, a multi-round training scenario can be used, as illustrated by multi-round training 600 in FIG. 6.

Returning again to FIG. 1, training updates generated by training module 162, along with any suitable information, such as weights of networks, training losses, training images (e.g., image frames, user annotations, synthetically-generated annotations, mask images, etc.), indicators of a number of rounds of annotations included in a training sample, combinations thereof, and the like, used by or calculated by training module 162 are stored in training data 144 of storage 134 and made available to modules of object segmentation application 112. In one example, training module 162 provides training updates to update network weights to interaction encoder module 152, interaction decoder module 154, propagation encoder module 158, and propagation decoder module 160.

In the example in FIG. 1, server 108 trains object segmentation system 110, and provides a trained object segmentation system to computing devices 104 for use in a client application. Hence, each of computing devices 104 includes segmentation system 114. Segmentation system 114 includes segmentation application 164. Segmentation application 164 can include any application configured to segment objects in video sequences, such as an image editing application, a video editing application, and the like.

Segmentation system 114 also includes assets 166. Assets 166 can include any suitable asset used by segmentation system 114, such as a pre-trained object segmentation system provided by server 108, training databases of image frames, combinations thereof, and the like. Segmentation system 114 also includes a copy of object segmentation system 110 of server 108. Hence, though in the example of FIG. 1 object segmentation system 110 of server 108 is described as training an object segmentation system and providing it to one of computing devices 104, computing devices 104 can additionally or alternatively train an object segmentation system. An object segmentation system trained by segmentation system 114 (e.g., using a copy of object segmentation system 110), can be stored in assets 166 and made available to any suitable application, such as segmentation application 164.

Having considered an example digital medium environment, consider now a discussion of an example object segmentation system in accordance with one or more aspects of the disclosure.

Example Object Segmentation System

Figure 7:
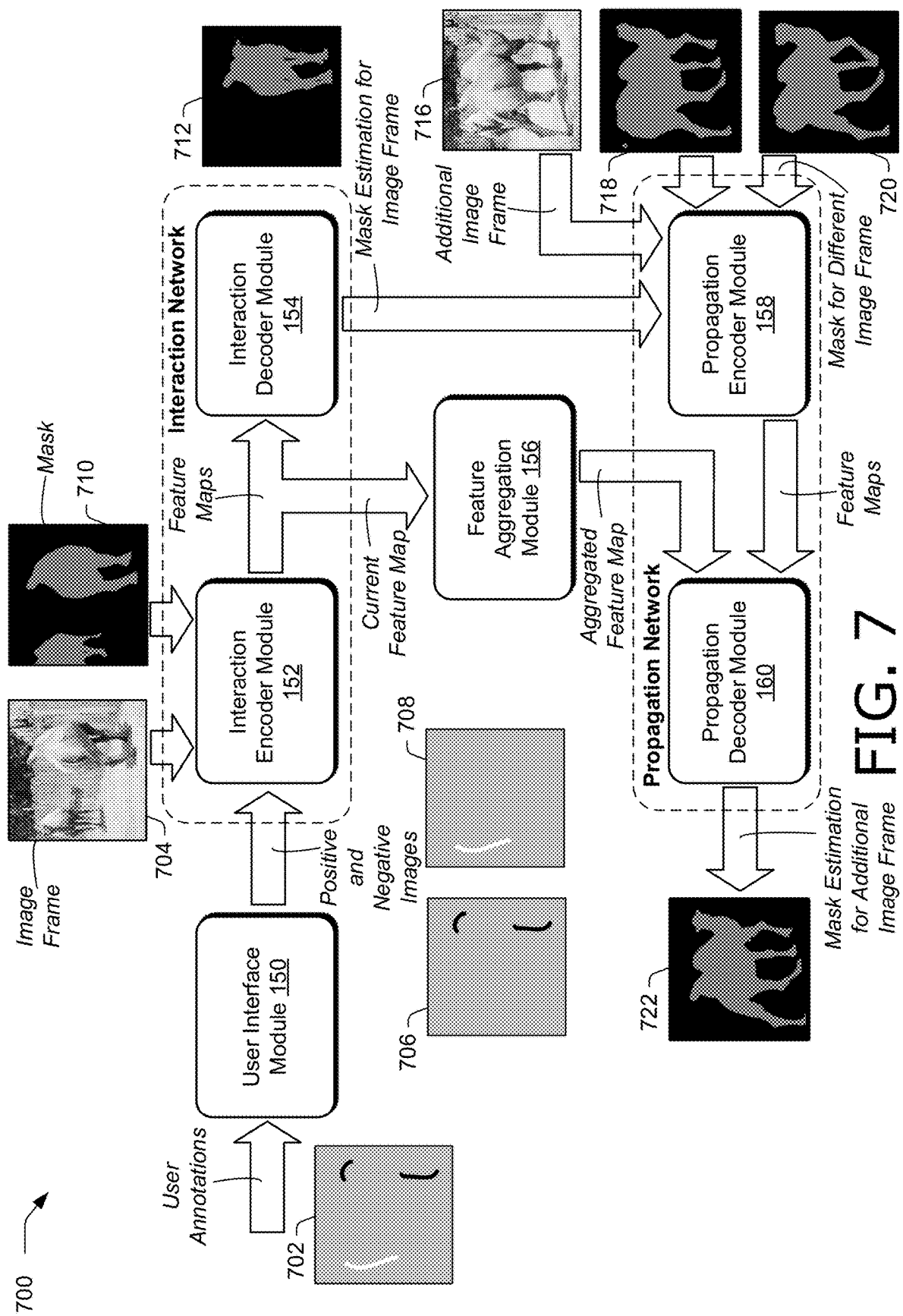
FIG. 7 illustrates an example object segmentation system in accordance with one or more aspects of the disclosure.

FIG. 7 illustrates an example object segmentation system 700 in accordance with one or more aspects of the disclosure. In this implementation, system 700 includes the modules of object segmentation application 112 as described in FIG. 1, e.g., user interface module 150, interaction encoder module 152, interaction decoder module 154, feature aggregation module 156, propagation encoder module 158, propagation decoder module 160, and training module 162. System 700 is one example of object segmentation system 110 that can be constructed using the modules of object segmentation application 112. For instance, signals can be redefined, and modules can be modified, combined, divided, added, or removed to form a modified system, without altering the functionality of system 700. Accordingly, such modified systems are considered to be within the scope of the disclosure.

Furthermore, for simplicity system 700 is limited to the modules of object segmentation application 112 and a description of some of their interconnects. System 700 can, however, include any suitable signals and communications between modules omitted for simplicity. Such signals may include system clocks, counters, image frame indicators, mask indicators, image frame identification numbers, reset signals, and the like. In one example, system 700 can operate in real time (e.g., with no perceptible delay to a user) to generate a mask image based on user annotations for one image frame and propagate the mask image to other image frames of a video sequence. Accordingly, signals can be calculated by the modules of system 700 and communicated between the modules of system 700 without significant delay. In one example, system 700 trains a network, such as an interaction network and a propagation network. Additionally or alternatively, system 700 can generate a mask image based on user annotations for a user-provided image frame and propagate the mask image to other image frames of a video sequence that includes the user-provided image frame.

Moreover, system 700 can be implemented on any suitable device or devices. In one example, system 700 is implemented on one computing device (e.g., server 108 or one of computing devices 104 in FIG. 1). In another example, system 700 is implemented on more than one computing device. For instance, parts of system 700 can be implemented by a first computing device, such as computing device 104-1 or server 108 in FIG. 1, and other parts of system 700 can be implemented by an additional computing device or devices, such as computing device 104-2. In one example, a server implements parts of system 700, such as server 108 in FIG. 1. A server can be remote, e.g., because it is not collocated with the first computing device. A server may be configured to receive signals of system 700 from a computing device (e.g., one or more of computing devices 104), process the received signals, such as with object segmentation system 110, and transmit results of the processing back to the computing device. Hence, object segmentation system 110 of server 108 in FIG. 1 may include system 700. In one example, system 700 is used to train an adaptive model (e.g., neural network, machine learning model, and the like) of an object segmentation system by a first computing device, such as by server 108, and the trained adaptive model is supplied by the first computing device to a different computing device, such as one of computing devices 104.

Additionally or alternatively, parts of system 700 can be implemented by an additional computing device that is collocated with a first computing device. For instance, one of computing devices 104 may be a first computing device, and another of computing devices 104 may be an additional, collocated computing device. The first computing device and the additional computing device may be operated by one or more users. Hence, system 700 provides for multiple users within an environment to share data included in system 700, such as mask estimations, user annotations, regions-of-interest, combinations thereof, and the like.

User interface module 150 receives user annotations corresponding to an image frame. For instance, user interface module 150 may receive user annotations for an image frame of a video sequence exposed in a user interface. User annotations 702 is an example of user annotations received for image frame 704 in FIG. 7. User annotations 702 includes both positive and negative annotations. For instance, black scribbles of user annotations 702 indicate an area of image frame 704 including a target object, and white scribbles of user annotations 702 indicate another area of image frame 704 that excludes the target object. In the example in FIG. 7, user annotations indicate that the target object includes the camel on the right side of image frame 704 and that the target object does not include the camel on the left side of image frame 704.

In one example, user annotations include annotations that are synthetically generated, such as according to a random walk or skeletization algorithm Hence, user annotations may be used to train system 700 to learn weights to segment objects in image frames of a video sequence.

User interface module 150 splits positive and negative annotations of a user annotation into respective positive and negative images. For instance, positive image 706 is an example of a positive image corresponding to the positive annotations of user annotations 702, and negative image 708 is an example of a negative image corresponding to the negative annotations of user annotations 702.

User interface module 150 provides a positive image and a negative image for each round of user annotations to interaction encoder module 152. Interaction encoder module 152 and interaction decoder module 154 are included in an interaction network of system 700 that generates a mask estimation for the image frame corresponding to user annotations received by user interface module 150 in a current round of user annotations, e.g., image frame 704 and user annotations 702, respectively.

Interaction encoder module 152 receives a positive image and a negative image from user interface module 150. Interaction encoder module 152 also receives image frame 704 and a mask image 710 corresponding to image frame 704. Mask image 710 includes a mask for a target object indicated in image frame 704, such as a mask generated by propagation decoder module 160 from a previous round of user annotations (e.g., a round of annotations received by user interface module 150 prior to receiving user annotations 702). In one example, if a previously-generated mask image for image frame 704 is not available (e.g., user annotations 702 may be a first round of user annotations received), interaction encoder module 152 may be configured to set all pixels of mask image 710 to a same value, such as 0.5. In one example, the same value is user-selectable, such as via a tab exposed in a user interface generated by user interface module 150.

Image frame 704, mask image 710, positive image 706, and negative image 708 are concatenated along channel dimensions and provided to interaction encoder module 152 as input. Interaction encoder module 152 includes an encoder network that includes a plurality of layers. Each layer extracts features into a respective feature map, and the feature maps are provided to interaction decoder module 154. Interaction decoder module 154 includes a decoder network that is complementary to the encoder network of interaction encoder module 152. Interaction encoder module 152 provides indeterminate feature maps to interaction decoder module 154 via skip connections that connect layers of the encoder network of interaction encoder module 152 to corresponding layers of the decoder network of interaction decoder module 154. Interaction encoder module 152 also provides a current feature map generated by a final layer of an encoder network of interaction encoder module 152 to interaction decoder module 154 and feature aggregation module 156.

Interaction decoder module 154 generates a mask estimation from the feature maps received from interaction encoder module 152. Mask estimation 712 is an example of a mask estimation that includes a mask generated for the target object indicated by user annotations 702 (e.g., the camel on the right side of image frame 704). In one example, mask estimation 712 is exposed in a user interface of user interface module 150. For instance, a user may annotate mask estimation 712 in a round of user annotations following user annotations 702. Interaction decoder module 154 provides mask estimation 712 to propagation encoder module 158.

Feature aggregation module 156 receives a current feature map from interaction encoder module 152, and accumulates it with a history of feature maps provided from interaction encoder module 152 to form an aggregated feature map. Feature aggregation module 156 can form an aggregated feature map in any suitable way. In one example, feature aggregation module 156 accumulates feature maps generated for each round of user annotations, and updates an aggregated feature map by combining a previously-generated aggregated feature map with a current feature map provided by the interaction network. Combining weights can be based on two weight vectors that sum to unity and are determined from respective feature vectors determined from the previously-generated aggregated feature map and the current feature map provided from interaction encoder module 152, as previously described with regards to FIG. 4. Feature aggregation module 156 provides an aggregated feature map to propagation decoder module 160.

Propagation encoder module 158 and propagation decoder module 160 are included in a propagation network of system 700. The propagation network propagates a mask generated by the interaction network of system 700 for one image frame of a video sequence (e.g., mask estimation 712 for image frame 704) to other image frames of the video sequence.

Propagation encoder module 158 receives mask estimation 712 from interaction decoder module 154 that corresponds to image frame 704. Propagation encoder module 158 also receives an additional image frame 716 of the video sequence. For instance, image frame 716 is a different image frame than image frame 704, such as a neighboring or nearby image frame in the video sequence.

Propagation encoder module 158 also receives mask image 718. Mask image 718 includes a mask for a target object in image frame 716, such as a mask generated from a previous round of user annotations (e.g., a round of user annotations received by user interface module 150 prior to receiving user annotations 702). In one example, if a previously-generated mask image for image frame 716 is not available, interaction encoder module 152 may be configured to set all pixels of mask image 718 to a same value, such as 0.5. In one example, the same value is user-selectable, such as via a tab exposed in a user interface generated by user interface module 150.

Propagation encoder module 158 also receives mask image 720. Mask image 720 corresponds to an image frame of the video sequence that is a different image frame than image frame 716 and has been generated for the current round of user annotations (e.g., based on user annotations 702). In one example, mask image 720 includes mask estimation 712 generated by interaction decoder module 154. Additionally or alternatively, mask image 720 may include a mask estimation generated by propagation decoder module 160. For instance, propagation encoder module 158 may be sequentially provided a number of image frames of a video sequence and propagate mask estimation 712 to each of the number of image frames. Propagation encoder module 158 may generate a mask estimation for a first image frame based on using mask estimation 712 as mask image 720, and generate a subsequent mask estimation for a subsequent image frame to the first image frame based on using the mask estimation generated for the first image frame as mask image 720.

Image frame 716, mask image 718, and mask image 720 are concatenated along channel dimensions and provided to propagation encoder module 158 as input. Propagation encoder module 158 includes an encoder network that includes a plurality of layers. Each layer extracts features into a respective feature map, and the feature maps are provided to propagation decoder module 160. Propagation decoder module 160 includes a decoder network that is complementary to the encoder network of propagation encoder module 158. Propagation encoder module 158 provides indeterminate feature maps to propagation decoder module 160 via skip connections that connect layers of the encoder network of propagation encoder module 158 to corresponding layers of the decoder network of propagation decoder module 160. Propagation encoder module 158 also provides a current feature map generated by a final layer of an encoder network of propagation encoder module 158 to propagation decoder module 160.

Propagation decoder module 160 receives feature maps from propagation encoder module 158 and an aggregated feature map from feature aggregation module 156. Propagation decoder module 160 concatenates a current feature map generated by a final layer of an encoder network of propagation encoder module 158 and an aggregated feature map received from feature aggregation module 156 along the channel dimensions of the decoder network, and generates mask estimation 722 corresponding to image frame 716. In one example, mask estimation 722 is exposed in a user interface of user interface module 150. For instance, a user may annotate mask estimation 722 in a round of user annotations following user annotations 702, where mask estimation 722 may be used as mask image 710. Additionally or alternatively, mask estimation 722 may be used as mask image 720 to generate an additional mask estimation by the propagation network given a different image frame than image frame 716 in a current round of user annotations (e.g., user annotations 702).

In one example, system 700 can be used to segment multiple objects in a video sequence in a multi-object scenario. For multiple target objects indicated in a round of user annotations to an image frame, respective masks are generated by an interaction network. The respective masks are merged into a multi-object mask, such as with a soft aggregation approach. The multi-object mask is propagated to different image frames in the video sequence by a propagation network.

The systems described herein constitute an improvement over systems that require multiple and complex user annotations for each image frame of a video sequence. Rather, the systems described herein include an interaction network to generate a mask for an image frame for which simple user annotations are received, such as user annotations that only partly indicate a target object to be segmented, and a propagation network to propagate the mask to other image frames of the video sequence. The interaction network and propagation network are coupled externally (e.g., each network can receive the other network's output as input) and internally by a feature aggregation module that accumulates features from each round of user annotations received. Hence, the systems described herein include object segmentation systems that reliably and accurately generate mask estimations for all image frames of a video sequence based on user annotations to only a small number of image frames of the video sequence. Moreover, the object segmentation systems described herein do not require costly reference image frames that contain fully-annotated object classes. Accordingly, the object segmentation systems described herein save time, money, and resources compared to object segmentation systems that require user annotations for all or most image frames of a video sequence, or expensive reference image frames.

Furthermore, the systems described herein constitute an improvement over systems that train object segmentation systems based on one round of annotations, compared to multiple rounds of annotations, such as for each input-output pair generated. Rather, the systems described herein train object segmentation systems in a multi-round training scenario where training updates are generated after receiving multiple rounds of annotations, and generating mask images for all image frames at each round of user annotations received. Accordingly, training updates are not based on mask images that include poor-quality masks. Hence, the systems described herein train object segmentation systems to learn weights that reliably and accurately segment objects in video sequences, and may not require as many training iterations (e.g., number of training images) compared to object segmentation systems trained based on each round of annotations.

Having considered an example system, consider now a discussion of example procedures for segmenting objects in video sequence in accordance with one or more aspects of the disclosure.

Example Procedures

Figure 8:
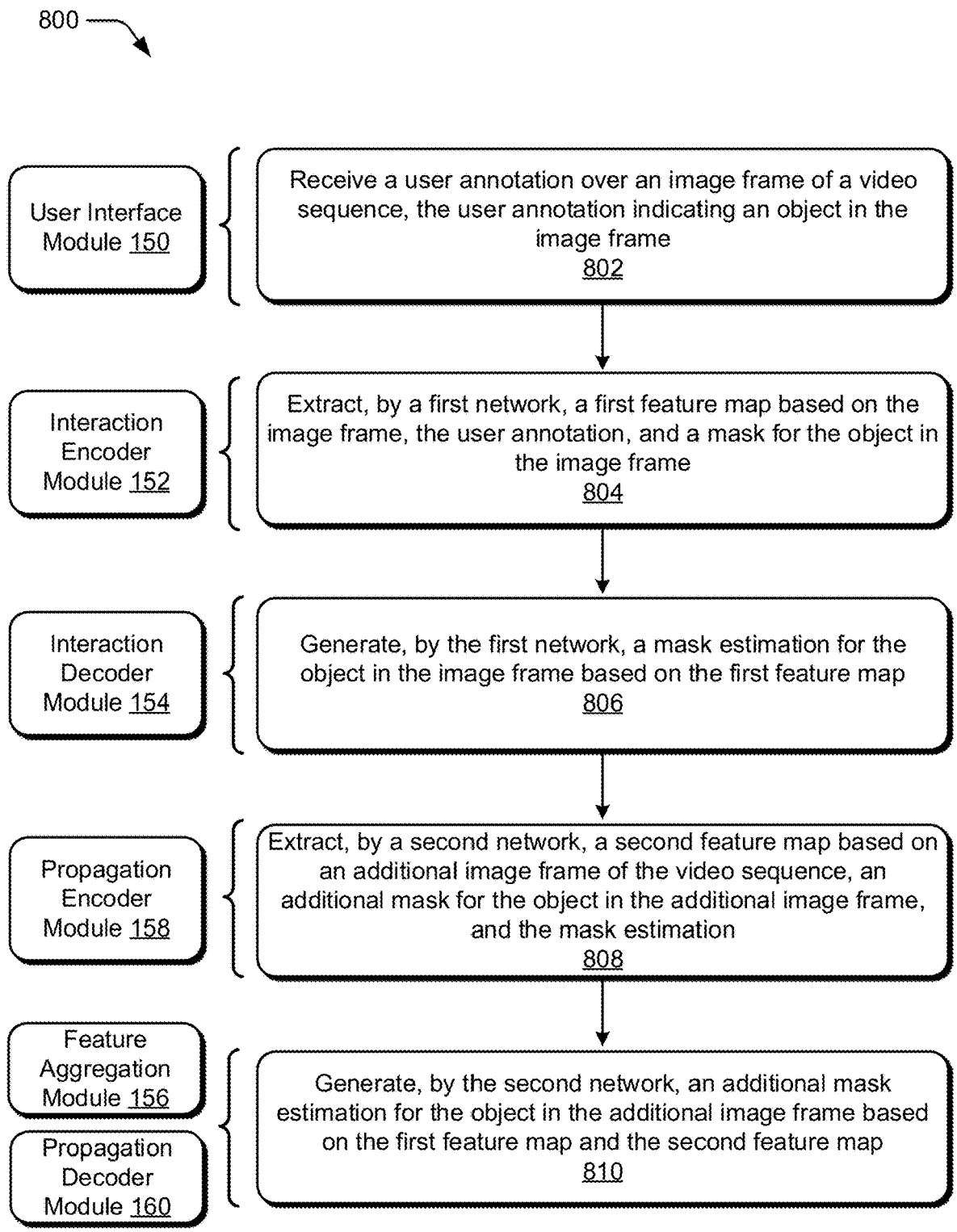
FIG. 8 illustrates a flow diagram depicting an example procedure in accordance with one or more aspects of the disclosure.

FIG. 8 illustrates an example procedure 800 for segmenting an object in a video sequence in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 104 or server 108 of FIG. 1 that makes use of an object segmentation system, such as system 700 in FIG. 7, or object segmentation system 110 in FIG. 1. An object segmentation system implementing procedure 800 may be an independent application that has been installed on the computing device, a service hosted by a service provider that is accessible by the computing device, a plug-in module to the computing device, or combinations thereof.

A user annotation is received over an image frame of a video sequence, the user annotation indicating an object in the image frame (block 802). In one example, user interface module 150 receives a user annotation over an image frame of a video sequence, the user annotation indicating an object in the image frame. Additionally or alternatively, the user annotation can include a first annotation that indicates a first area of the image frame that includes the object and a second annotation that indicates a second area of the image frame that does not include the object.

A first feature map is extracted by a first network based on the image frame, the user annotation, and a mask for the object in the image frame (block 804). In one example, interaction encoder module 152 includes an encoder network of a first network that extracts a first feature map based on the image frame, the user annotation, and a mask for the object in the image frame.

In one example, a region-of-interest is determined in the image frame based on the user annotation, the image frame is resized based on the region-of-interest to form a resized image frame, and features from the resized image frame are extracted into the first feature map.

A mask estimation for the object in the image frame is generated by the first network based on the first feature map (block 806). In one example, interaction decoder module 154 includes a decoder network of the first network that generates a mask estimation for the object in the image frame based on the first feature map.

A second feature map is extracted by a second network based on an additional image frame of the video sequence, an additional mask for the object in the additional image frame, and the mask estimation (block 808). In one example, propagation encoder module 158 includes an encoder network of a second network that extracts a second feature map based on an additional image frame of the video sequence, an additional mask for the object in the additional image frame, and the mask estimation.

In one example, extracting the second feature map includes propagating the mask estimation to a neighboring frame of the additional image frame to generate a propagated mask estimation, and said extracting the second feature map is determined using the propagated mask estimation.

An additional mask estimation for the object in the additional image frame is generated by the second network based on the first feature map and the second feature map (block 810). In one example, propagation decoder module 160 includes a decoder network of the second network that generates an additional mask estimation for the object in the additional image frame based on the first feature map and the second feature map that are accumulated by feature aggregation module 156.

Additionally or alternatively, generating the additional mask estimation can include concatenating the first feature map and the second feature map. For instance, an aggregated feature map may be generated from the first feature map and a previous aggregated feature map, the previous aggregated feature map determined from a previous user annotation indicating the object than the user annotation, and generating the additional mask estimation can be based on the aggregated feature map.

In one example, the aggregated feature map is generated by forming a first feature vector from the first feature map by averaging across spatial dimensions of the first feature map, forming a second feature vector from the previous aggregated feature map by averaging across spatial dimensions of the previous aggregated feature map, determining two weight vectors whose sum is unity from a concatenation of the first feature vector and the second feature vector, and merging a weighted sum of the first feature map and the previous aggregated feature map with weights determined from the two weight vectors.

In one example, the mask for the object in the image frame is generated by the second network. Additionally or alternatively, the mask for the object in the image frame can be generated based on an additional user annotation indicating the object in a different image frame of the video sequence than the image frame.

In one example, the additional mask for the object in the additional image frame is determined from a previous user annotation indicating the object than the user annotation. Additionally or alternatively, the extracting the second feature map and the generating the additional mask estimation are repeated until a respective mask estimation is generated for each image frame of the video sequence.

Figure 9:
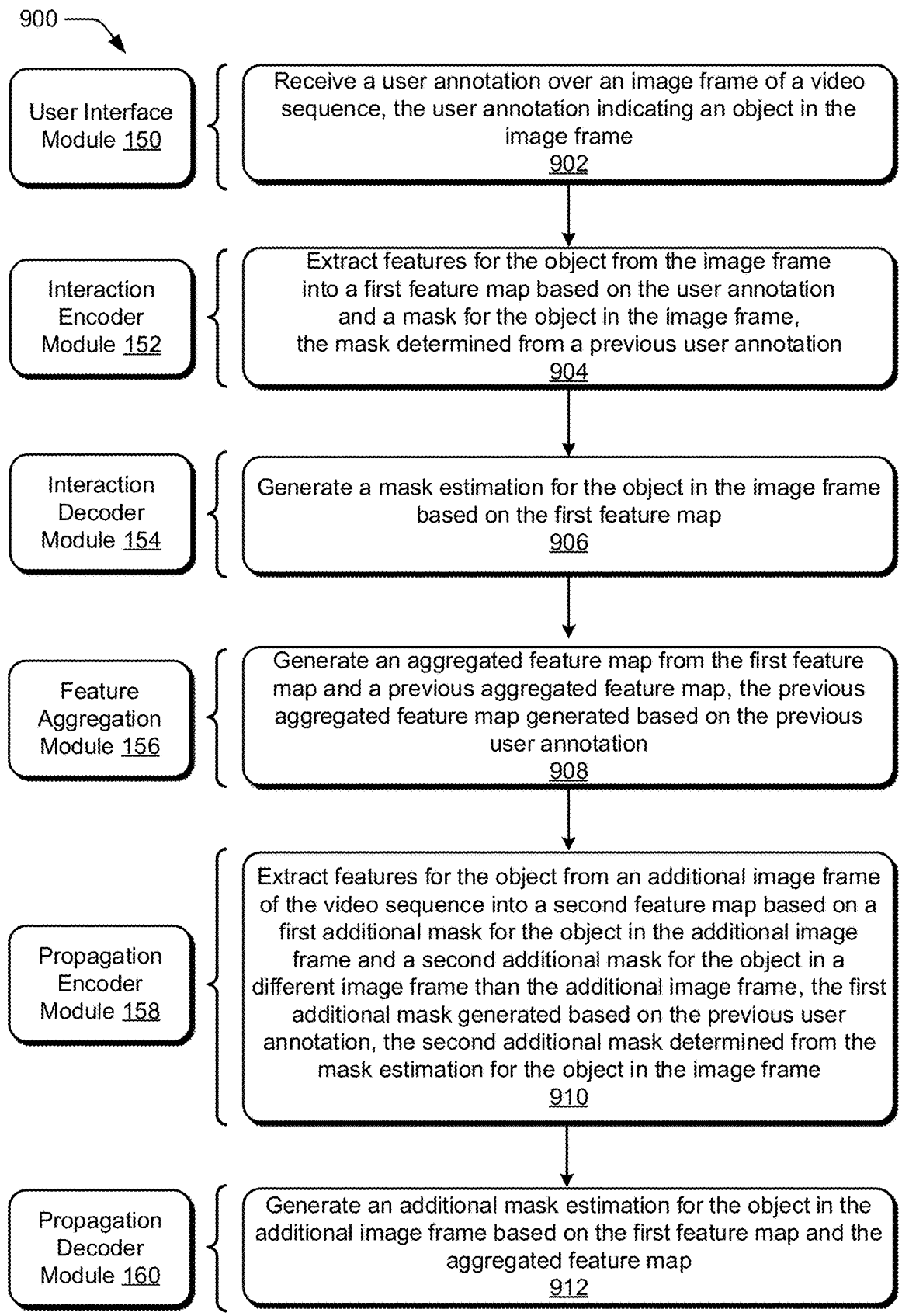
FIG. 9 illustrates a flow diagram depicting an example procedure in accordance with one or more aspects of the disclosure.

FIG. 9 illustrates an example procedure 900 for segmenting an object in a video sequence in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 104 or server 108 of FIG. 1 that makes use of an object segmentation system, such as system 700 in FIG. 7, or object segmentation system 110 in FIG. 1. An object segmentation system implementing procedure 900 may be an independent application that has been installed on the computing device, a service hosted by a service provider that is accessible by the computing device, a plug-in module to the computing device, or combinations thereof.

A user annotation is received over an image frame of a video sequence, the user annotation indicating an object in the image frame (block 902). In one example, user interface module 150 receives a user annotation over an image frame of a video sequence, the user annotation indicating an object in the image frame.

Features for the object are extracted from the image frame into a first feature map based on the user annotation and a mask for the object in the image frame, the mask determined from a previous user annotation (block 904). In one example, interaction encoder module 152 includes an encoder network of an interaction network that extracts features for the object from the image frame into a first feature map based on the user annotation and a mask for the object in the image frame, the mask determined from a previous user annotation.

A mask estimation for the object in the image frame is generated based on the first feature map (block 906). In one example, interaction decoder module 154 includes a decoder network of the interaction network that generates a mask estimation for the object in the image frame based on the first feature map.

An aggregated feature map is generated from the first feature map and a previous aggregated feature map, the previous aggregated feature map generated based on the previous user annotation (block 908). In one example, feature aggregation module 156 generates an aggregated feature map from the first feature map and a previous aggregated feature map, the previous aggregated feature map generated based on the previous user annotation.

Features for the object are extracted from an additional image frame of the video sequence into a second feature map based on a first additional mask for the object in the additional image frame and a second additional mask for the object in a different image frame than the additional image frame, the first additional mask generated based on the previous user annotation, the second additional mask determined from the mask estimation for the object in the image frame (block 910). In one example, propagation encoder module 159 includes an encoder network of a propagation network that extracts features for the object from an additional image frame of the video sequence into a second feature map based on a first additional mask for the object in the additional image frame and a second additional mask for the object in a different image frame than the additional image frame, the first additional mask generated based on the previous user annotation, the second additional mask determined from the mask estimation for the object in the image frame. Additionally or alternatively, the different image frame can be adjacent to the additional image frame in the video sequence. In one example, the different image frame is adjacent to the additional image frame in the video sequence.

An additional mask estimation for the object in the additional image frame is generated based on the first feature map and the aggregated feature map (block 912). In one example, propagation decoder module 160 includes a decoder network of the propagation network that generates an additional mask estimation for the object in the additional image frame based on the first feature map and the aggregated feature map.

Additionally or alternatively, the propagation network can determine a respective additional mask estimation for the object in each frame of the video sequence other than the image frame.

In one example, the additional mask estimation is combined with a previous mask estimation for the object in the additional image frame, the previous mask estimation determined by the propagation network based on the previous user annotation. Additionally or alternatively, weights of the combining can be determined from a distance in the video sequence between the additional image frame and another image frame for which the previous user annotation is received.

In one example, the interaction network and the propagation network are jointly trained by updating respective weights of the interaction network and the propagation network based on multiple synthesized annotations at respective different image frames of the video sequence, respective mask estimations for the object for each image frame of the video sequence being determined for each of the multiple synthesized annotations.

Figure 10:
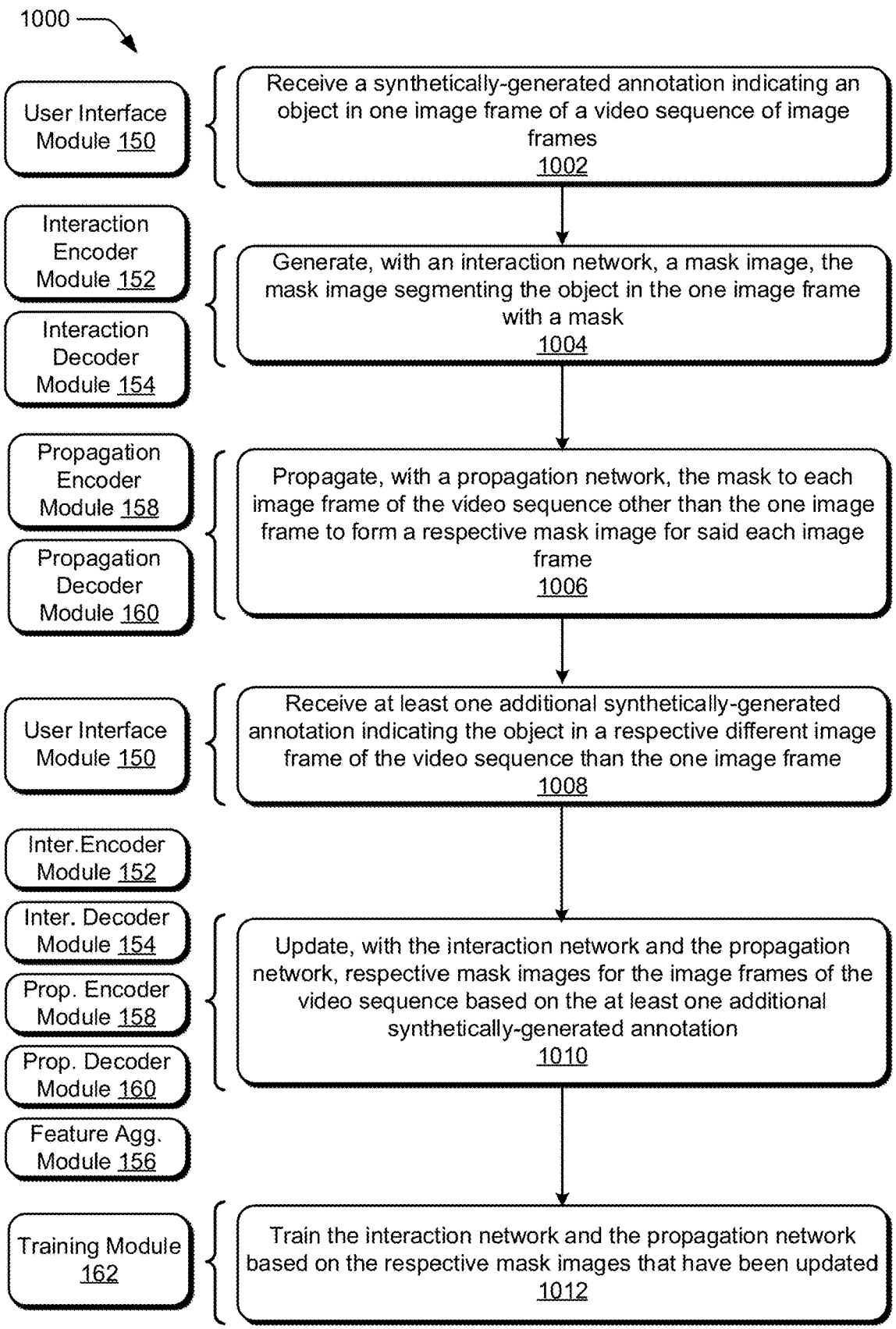
FIG. 10 illustrates a flow diagram depicting an example procedure in accordance with one or more aspects of the disclosure.

FIG. 10 illustrates an example procedure 1000 for segmenting an object in a video sequence in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 104 or server 108 of FIG. 1 that makes use of an object segmentation system, such as system 700 in FIG. 7, or object segmentation system 110 in FIG. 1. An object segmentation system implementing procedure 1000 may be an independent application that has been installed on the computing device, a service hosted by a service provider that is accessible by the computing device, a plug-in module to the computing device, or combinations thereof.

A synthetically-generated annotation indicating an object in one image frame of a video sequence of image frames is received (block 1002). In one example, user interface module 150 receives a synthetically-generated annotation indicating an object in one image frame of a video sequence of image frames.

A mask image is generated with an interaction network, the mask image segmenting the object in the one image frame with a mask (block 1004). In one example, interaction encoder module 152 includes an encoder network of the interaction network and interaction decoder module 154 includes a decoder network of the interaction network that generates a mask image, the mask image segmenting the object in the one image frame with a mask.

The mask is propagated with a propagation network to each image frame of the video sequence other than the one image frame to form a respective mask image for said each image frame (block 1006). In one example, propagation encoder module 158 includes an encoder network of the propagation network and propagation decoder module 1560 includes a decoder network of the propagation network that propagates the mask to each image frame of the video sequence other than the one image frame to form a respective mask image for said each image frame.

At least one additional synthetically-generated annotation indicating the object in a respective different image frame of the video sequence than the one image frame is received (block 1008). In one example, user interface module 150 receives at least one additional synthetically-generated annotation indicating the object in a respective different image frame of the video sequence than the one image frame.

Respective mask images for the image frames of the video sequence are updated with the interaction network and the propagation network based on the at least one additional synthetically-generated annotation (block 1010). In one example, interaction encoder module 152, interaction decoder module 154, propagation encoder module 158, propagation decoder module 160, and feature aggregation module 156 update, with the interaction network and the propagation network, respective mask images for the image frames of the video sequence based on the at least one additional synthetically-generated annotation.

The interaction network and the propagation network are trained based on the respective mask images that have been updated (block 1012). In one example, training module 162 trains the interaction network and the propagation network based on the respective mask images that have been updated.

In one example, the synthetically-generated annotation is generated by selecting a seed pixel within an area in the one image frame including the object, and generating a random walk whose step size is determined based on the area. Additionally or alternatively, the synthetically-generated annotation can be generated by determining an area in the one image frame including the object, and generating a skeleton for the area by thinning pixels of the area until the skeleton remains.

The procedures described herein constitute an improvement over procedures that require multiple and complex user annotations for each image frame of a video sequence. Rather, the procedures described herein describe an interaction network to generate a mask for an image frame for which simple user annotations are received, such as user annotations that only partly indicate a target object to be segmented, and a propagation network to propagate the mask to other image frames of the video sequence. The interaction network and propagation network are coupled externally (e.g., each network can receive the other network's output as input) and internally by a feature aggregation module that accumulates features from each round of user annotations received. Hence, the procedures described herein describe object segmentation systems that reliably and accurately generate mask estimations for all image frames of a video sequence based on user annotations to only a small number of image frames of the video sequence. Moreover, the procedures described herein do not require costly reference image frames that contain full-annotated object classes. Accordingly, the procedures described herein save time, money, and resources compared to procedures that require user annotations for all or most image frames of a video sequence, or expensive reference image frames.

Furthermore, the procedures described herein constitute an improvement over procedures that train object segmentation systems based on one round of annotations, compared to multiple rounds of annotations, such as for each input-output pair generated. Rather, the procedures described herein train object segmentation systems in a multi-round training scenario where training updates are generated after receiving multiple rounds of annotations, and generating mask images for all image frames at each round of user annotations received. Accordingly, training updates are not based on mask images that include poor-quality masks. Hence, the procedures described herein train object segmentation systems to learn weights that reliably and accurately segment objects in video sequences, and may not require as many training iterations (e.g., number of training images) compared to procedures that train object segmentation systems based on each round of annotations.

Having considered example procedures in accordance with one or more implementations, consider now example systems and devices that can be utilized to practice the inventive principles described herein.

Example Systems and Devices

FIG. 11 illustrates an example system generally at 1100 that includes example computing devices 1102-1, 1102-2, 1102-3, 1102-4, 1102-5, and 1102-6 (collectively 1102) that are representative of one or more computing systems and devices that may implement the various techniques described herein. Computing devices 1102 can be any suitable computing device (e.g., user computing devices). Computing devices 1102 may be, for example, a user computing device (e.g., one of computing devices 104), or a server device, (e.g., server 108). Furthermore, computing devices 1102 may include an on-chip system, multiple computing devices, combinations thereof, or any other suitable computing device or computing system. Accordingly, FIG. 11 illustrates computing devices 1102 as one or more of a desktop computer, a laptop computer, a tablet, a camera, smart eye glasses, and a smart phone, though these examples are illustrative and in no way are meant to limit the type or number of devices included in computing devices 1102.

Furthermore, computing devices 1102 are coupled to "cloud" 1104 including platform 1106 that is representative of one or more computing systems and devices that may implement the various techniques described herein, such as servers, edge servers, global servers, or combinations thereof. This is illustrated through inclusion of object segmentation application 112, segmentation application 164, object segmentation system 110, segmentation system 114, server 108, and system 700 in modules of platform 1106, which operate as described above.

Functionality of computing devices 1102 may be implemented all or in part through use of a distributed system, such as over a "cloud" 1104 via a platform 1106. Furthermore, platform 1106 may host data accessible by computing devices 1102, and therefore computing devices 1102 may be required to be authenticated to platform 1106.

Platform 1106 includes a processing system 1108, one or more computer-readable media 1110, and one or more I/O interfaces 1112 that are communicatively coupled to each other. Although not shown, platform 1106 may further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

Processing system 1108 is representative of functionality to perform one or more operations using hardware. Accordingly, processing system 1108 is illustrated as including hardware elements 1114 that may be configured as processors, functional blocks, and so forth. This may include implementation in hardware as an application specific integrated circuit or other logic device formed using one or more semiconductors. Hardware elements 1114 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions. Processors 132 in FIG. 1 are examples of processing system 1108.

Computer-readable media 1110 (e.g., computer-readable storage media) is illustrated as including memory/storage 1116. Storage 134 in FIG. 1 is an example of memory/storage included in memory/storage 1116. Memory/storage component 1116 may include volatile media (such as random access memory (RAM)), nonvolatile media (such as read only memory (ROM), Flash memory, optical disks, magnetic disks, and so forth), or combinations thereof. Memory/storage component 1116 may include fixed media (e.g., RAM, ROM, a fixed hard drive, and so on) as well as removable media (e.g., Flash memory, a removable hard drive, an optical disc, and so forth). Computer-readable media 1110 may be configured in a variety of other ways as further described below.

Input/output interface(s) 1112 are representative of functionality to allow a user (e.g., a system administrator of platform 1106) to enter commands and information to platform 1106, and also allow information to be presented to the user and other components or devices using various input/output devices. Examples of input devices include a keyboard, a cursor control device (e.g., a mouse), a microphone, an array of microphones, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, platform 1106 may be configured in a variety of ways as further described below to support user interaction.

Platform 1106 also includes applications 1118. Applications 1118 are representative of any suitable applications capable of running on platform 1106, and may include a web browser which is operable to access various kinds of web-based resources (e.g., assets, media clips, images, content, configuration files, services, user profiles, advertisements, coupons, and the like. Applications 1118 include object segmentation application 112 and segmentation application 164, as previously described. Furthermore, applications 1118 includes any applications supporting object segmentation system 110, segmentation system 114, or system 700.

Cloud 1104 includes and is representative of a platform 1106. Platform 1106 abstracts underlying functionality of hardware (e.g., servers) and software resources of cloud 1104, and includes resources 1120. Resources 1120 may include applications, data, services, and content that can be utilized while computer processing is executed on servers that are remote from computing devices 1102. Resources 1120 can also include services provided over the Internet, through a subscriber network, such as a cellular or Wi-Fi network, or combinations thereof.

Resources 1120 include segmentation system store 1122, which operates to provide one or more networks of an object segmentation system to one of computing devices 1102, such as networks that have been pre-trained in a multi-round training scenario, as previously described. Resources 1120 also includes training dataset store, which operates to provide one or more training datasets of image frames, video sequence, and annotations (e.g., user annotations and synthetically-generated annotations) that can be used to train an object segmentation system as described herein.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by platform 1106. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the platform 1106, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1114 and computer-readable media 1110 are representative of modules, programmable device logic, fixed device logic implemented in a hardware form, or combinations thereof that may be employed in some aspects to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more hardware elements 1114, or combinations thereof. Platform 1106 may be configured to implement particular instructions and functions corresponding to the software and hardware modules. Accordingly, implementation of a module that is executable by platform 1106 as software may be achieved at least partially in hardware, e.g., through use of computer-readable storage media and hardware elements 1114 of processing system 1108. The instructions and functions may be executable/operable by one or more articles of manufacture (for example, processing system 1108) to implement techniques, modules, and examples described herein.

CONCLUSION

In one or more implementations, a digital medium environment includes at least one computing device. Systems, techniques, and devices are described herein for segmenting objects in video sequences. A user can provide annotations, such as scribbles, to designate an object in any image frame of a video sequence, and is not required to provide user annotations for all image frames. An interaction network receives a user annotation for an image frame, and generates a mask estimation for the object in the image frame. The interaction network is coupled both internally and externally to a propagation network that propagates the mask estimation for the image frame to other image frames of the video sequence, so that an object mask is generated for each image frame of the video sequence for each user annotation received. A feature aggregation module aggregates feature maps generated by the interaction network for each user annotation and provides an aggregated feature map to the propagation network. The interaction network and the propagation network are trained jointly using synthetic annotations in a multi-round training scenario, in which weights of the interaction network and the propagation network are adjusted after the multiple synthetic annotations are received and respective masks generated, resulting in a trained object segmentation system that can reliably generate realistic object masks.

Although the invention has been described in language specific to structural features and methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to segment objects in video sequences, a method implemented by a computing device, the method comprising:
   receiving, by the computing device, a user annotation over an image frame of a video sequence, the user annotation indicating an object in the image frame;
   extracting, by a first network of the computing device, a first feature map based on the image frame, the user annotation, and a mask for the object in the image frame;
   generating, by the first network of the computing device, a mask estimation for the object in the image frame based on the first feature map;
   extracting, by a second network of the computing device, a second feature map based on an additional image frame of the video sequence, an additional mask for the object in the additional image frame, and the mask estimation; and
   generating, by the second network of the computing device, an additional mask estimation for the object in the additional image frame based on the first feature map and the second feature map.

2. The method as described in claim 1, wherein the mask for the object in the image frame is generated by the second network.

3. The method as described in claim 2, wherein the mask for the object in the image frame is further generated based on an additional user annotation indicating the object in a different image frame of the video sequence than the image frame.

4. The method as described in claim 1, wherein the additional mask for the object in the additional image frame is determined from a previous user annotation indicating the object than the user annotation.

5. The method as described in claim 1, wherein the extracting the second feature map includes propagating the mask estimation to a neighboring frame of the additional image frame to generate a propagated mask estimation, and said extracting the second feature map is determined using the propagated mask estimation.

6. The method as described in claim 1, wherein the generating the additional mask estimation includes concatenating the first feature map and the second feature map.

7. The method as described in claim 1, further comprising generating an aggregated feature map from the first feature map and a previous aggregated feature map, the previous aggregated feature map determined from a previous user annotation indicating the object than the user annotation, wherein the generating the additional mask estimation is based on the aggregated feature map.

8. The method as described in claim 7, wherein the aggregated feature map is generated by:
   forming a first feature vector from the first feature map by averaging across spatial dimensions of the first feature map;
   forming a second feature vector from the previous aggregated feature map by averaging across spatial dimensions of the previous aggregated feature map;
   determining two weight vectors whose sum is unity from a concatenation of the first feature vector and the second feature vector; and merging a weighted sum of the first feature map and the previous aggregated feature map with weights determined from the two weight vectors.

9. The method as described in claim 1, wherein the user annotation includes a first annotation that indicates a first area of the image frame that includes the object and a second annotation that indicates a second area of the image frame that does not include the object.

10. The method as described in claim 1, wherein the extracting the second feature map and the generating the additional mask estimation are repeated until a respective mask estimation is generated for each image frame of the video sequence.

11. The method as described in claim 1, further comprising:
   determining a region-of-interest in the image frame based on the user annotation;
   resizing the image frame based on the region-of-interest to form a resized image frame; and
   extracting features from the resized image frame into the first feature map.

12. In a digital medium environment to segment objects in video sequences, a system comprising:
   a user interface module implemented at least partially in hardware of a computing device to receive a user annotation over an image frame of a video sequence, the user annotation indicating an object in the image frame;
   an interaction encoder module of an interaction network implemented at least partially in hardware of the computing device to extract features for the object from the image frame into a first feature map based on the user annotation and a mask for the object in the image frame, the mask determined from a previous user annotation;
   an interaction decoder module of the interaction network implemented at least partially in hardware of the computing device to generate a mask estimation for the object in the image frame based on the first feature map;
   a feature aggregation module implemented at least partially in hardware of the computing device to generate an aggregated feature map from the first feature map and a previous aggregated feature map, the previous aggregated feature map generated based on the previous user annotation;
   a propagation encoder module of a propagation network implemented at least partially in hardware of the computing device to extract features for the object from an additional image frame of the video sequence into a second feature map based on a first additional mask for the object in the additional image frame and a second additional mask for the object in a different image frame than the additional image frame, the first additional mask generated based on the previous user annotation, the second additional mask determined from the mask estimation for the object in the image frame; and
   a propagation decoder module of the propagation network implemented at least partially in hardware of the computing device to generate an additional mask estimation for the object in the additional image frame based on the first feature map and the aggregated feature map.

13. The system as described in claim 12, wherein the different image frame is adjacent to the additional image frame in the video sequence.

14. The system as described in claim 12, wherein the propagation network determines a respective additional mask estimation for the object in each frame of the video sequence other than the image frame.

15. The system as described in claim 12, further comprising combining the additional mask estimation with a previous mask estimation for the object in the additional image frame, the previous mask estimation determined by the propagation network based on the previous user annotation.

16. The system as described in claim 15, wherein weights of the combining are determined from a distance in the video sequence between the additional image frame and another image frame for which the previous user annotation is received.

17. The system as described in claim 12, wherein the interaction network and the propagation network are jointly trained by updating respective weights of the interaction network and the propagation network based on multiple synthesized annotations at respective different image frames of the video sequence, respective mask estimations for the object for each image frame of the video sequence being determined for each of the multiple synthesized annotations.

18. In a digital medium environment to segment objects in video sequences, a method implemented by a computing device, the method comprising:
   a step for receiving a synthetically-generated annotation indicating an object in one image frame of a video sequence of image frames;
   a step for generating, with an interaction network, a mask image, the mask image segmenting the object in the one image frame with a mask;
   a step for propagating, with a propagation network, the mask to each image frame of the video sequence other than the one image frame to form a respective mask image for said each image frame;
   a step for receiving at least one additional synthetically-generated annotation indicating the object in a respective different image frame of the video sequence than the one image frame;
   a step for updating, with the interaction network and the propagation network, respective mask images for the image frames of the video sequence based on the at least one additional synthetically-generated annotation; and
   a step for training the interaction network and the propagation network based on the respective mask images that have been updated.

19. The method as described in claim 18, wherein the synthetically-generated annotation is generated by:
   selecting a seed pixel within an area in the one image frame including the object; and
   generating a random walk whose step size is determined based on the area.

20. The method as described in claim 18, wherein the synthetically-generated annotation is generated by:
   determining an area in the one image frame including the object; and
   generating a skeleton for the area by thinning pixels of the area until the skeleton remains.

* * * * *